US011723116B2

(12) United States Patent
Han et al.

(10) Patent No.: US 11,723,116 B2
(45) Date of Patent: Aug. 8, 2023

(54) ELECTRONIC DEVICE FOR PERFORMING PRECODING AND METHOD FOR OPERATING THE SAME

(71) Applicant: Samsung Electronics Co., Ltd., Suwon-si (KR)

(72) Inventors: Yonggue Han, Suwon-si (KR); He Wang, Beijing (CN); Taeyoon Kim, Suwon-si (KR); Chaiman Lim, Suwon-si (KR); Liang Yan, Beijing (CN); Ri Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/838,628

(22) Filed: Apr. 2, 2020

(65) Prior Publication Data

US 2020/0413488 A1 Dec. 31, 2020

(30) Foreign Application Priority Data

Jun. 27, 2019 (KR) .................. 10-2019-0077083

(51) Int. Cl.
*H04W 88/10* (2009.01)
*H04W 88/02* (2009.01)
(Continued)

(52) U.S. Cl.
CPC .......... *H04W 88/10* (2013.01); *H04B 7/0456* (2013.01); *H04L 5/0051* (2013.01);
(Continued)

(58) Field of Classification Search
USPC ....................................................... 370/329
See application file for complete search history.

(56) References Cited

U.S. PATENT DOCUMENTS

2011/0255635 A1 10/2011 Lee et al.
2012/0121031 A1* 5/2012 Tang ...................... H04B 7/046
375/267
(Continued)

FOREIGN PATENT DOCUMENTS

| CN | 109478908 A | 3/2019 |
|---|---|---|
| CN | 109565311 A | 4/2019 |
| WO | WO-2018075963 A1 * | 4/2018 |

OTHER PUBLICATIONS

ZTE, Maintenance for Multi-antenna scheme, Oct. 8-12, 2018, 3GPP TSG RAN WG1 Meeting #94bis R1-1810212 (Year: 2018).*
(Continued)

*Primary Examiner* — Jeffrey M Rutkowski
*Assistant Examiner* — Luna Weissberger
(74) *Attorney, Agent, or Firm* — Jefferson IP Law, LLP

(57) ABSTRACT

An electronic device is provided. The electronic device includes a RFIC to convert data transmitted from the a communication processor into a RF signal and output the RF signal, and an antenna configured to receive the RF signal and radiate an electromagnetic field, the communication processor is configured to receive, from a BS, a reference signal for identifying a state of a downlink channel between the electronic device and the BS through the antenna and the RFIC, based on the reference signal and association information between the downlink channel and an uplink channel and between the electronic device and the BS, identify the uplink channel, based on the identified uplink channel, identify a precoder for the uplink channel, based on the identified precoder, precode uplink data and a DMRS, and transmit a signal based on the precoded data to the BS using at least some of the RFIC and the antenna.

19 Claims, 20 Drawing Sheets

(51) Int. Cl.
  *H04W 4/80* (2018.01)
  *H04L 25/02* (2006.01)
  *H04B 7/0456* (2017.01)
  *H04L 5/00* (2006.01)
  *H04L 5/10* (2006.01)

(52) U.S. Cl.
  CPC ............ *H04L 5/10* (2013.01); *H04L 25/0226* (2013.01); *H04W 4/80* (2018.02)

(56) References Cited

U.S. PATENT DOCUMENTS

| | | |
|---|---|---|
| 2012/0188962 A1 | 7/2012 | Gao et al. |
| 2015/0063485 A1 | 3/2015 | Lee et al. |
| 2015/0326383 A1* | 11/2015 | Wong ................ H04B 7/024 375/267 |
| 2016/0142115 A1 | 5/2016 | Onggosanusi et al. |
| 2016/0157218 A1 | 6/2016 | Nam et al. |
| 2018/0041259 A1 | 2/2018 | Kim et al. |
| 2018/0146419 A1* | 5/2018 | Raghavan ............ H04B 7/0617 |
| 2018/0167183 A1 | 6/2018 | Zhang et al. |
| 2018/0205480 A1* | 7/2018 | Akkarakaran ........ H04L 5/0035 |
| 2018/0262242 A1* | 9/2018 | Chakraborty .......... H04B 7/063 |
| 2019/0149299 A1 | 5/2019 | Lee et al. |
| 2019/0181925 A1 | 6/2019 | Kang et al. |
| 2019/0199553 A1 | 6/2019 | Park et al. |
| 2020/0112419 A1* | 4/2020 | Bagheri ................ H04L 5/0048 |
| 2020/0245378 A1* | 7/2020 | Dhanda ................ H04W 76/10 |
| 2020/0275416 A1* | 8/2020 | Haghighat ............ H04W 72/23 |

OTHER PUBLICATIONS

Samsung, R1-1705336, UL Transmission Scheme with Reciprocity, 3GPP TSG RAN WG1 88bis, Mar. 24, 2017, Spokane, USA.
Nokia et al., R1-1716491, Non-codebook based UL-MIMO transmission, 3GPP TSG-RAN WG1 Meeting NR#3, Sep. 11, 2017, Nagoya, Japan.
ZTE, R1-1810212, Maintenance for Multi-antenna scheme, 3GPP TSG RAN WG1 Meeting #94bis, Sep. 29, 2018, Chengdu, China.
International Search Report dated Jul. 13, 2020, issued in International Patent Application No. PCT/KR2020/004565.
Samsung, PRB bundling and precoding granularity in UL DMRS, R1-1702914, 3GPP TSG RAN1 88, Feb. 12, 2017, Athens.
Nokia et al., Uplink MIMO Transmission in NR, R1-1701079, 3GPP TSG RAN WG1 NR Ad-Hoc Meeting, Jan. 16, 2017, Spokane, USA.
Catt, Discussion on non-codebook based transmission for UL, R1-1715795, 3GPP TSG RAN WG1 Meeting NR#3, Sep. 17, 2017, Nagoya, Japan.
European Search Report dated May 27, 2022, issued in European Application No. 20832675.1.
Chinese Examination Report dated Jun. 7, 2023, issued in Chinese Application No. 202080045807.0.

* cited by examiner

ELECTRONIC DEVICE FOR PERFORMING PRECODING AND METHOD FOR OPERATING THE SAME

CROSS-REFERENCE TO RELATED APPLICATION(S)

This application is based on and claims priority under 35 U.S.C. § 119(a) of a Korean patent application number 10-2019-0077083, filed on Jun. 27, 2019, in the Korean Intellectual Property Office, the disclosure of which is incorporated by reference herein in its entirety.

BACKGROUND

1. Field

The disclosure relates to an electronic device that performs precoding and a method of operating the same. More particularly, the disclosure relates to precoding data based upon an associating between devices and associating between channels, identify a precoder for an uplink channel.

2. Description of Related Art

To meet the demand for wireless data traffic, which has increased since the commercialization of $4^{th}$-generation (4G) communication systems, efforts have been made to develop improved $5^{th}$-generation (5G) communication system or pre-5G communication systems. Therefore, such a 5G communication system or pre-5G communication system is called a "beyond-4G-network communication system" or a "post-long-term evolution (LTE) system".

Consideration is being given to implementation of the 5G communication system in super-high-frequency (mm Wave) bands (e.g., a frequency band such as a 60 GHz band) so as to accomplish higher data rates. In order to reduce pathloss of radio waves and increase the propagation distance of radio waves in super-high-frequency bands, techniques such as beamforming, massive multiple-input multiple-output (MIMO), full-dimensional MIMO (FD-MIMO), array antennas, analog beamforming, and large-scale antennas are being discussed for 5G communication systems.

According to 3rd generation partnership project (3GPP) TS 38.214, a terminal may perform precoding, based on a codebook or a non-codebook, depending on a higher-layer parameter for uplink (UL)-MIMO transmission, and a base station (BS) determines precoding of the terminal.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method that determines a precoder for uplink and a method of operating the same, and/or an electronic device capable of transmitting data of either one of both types of network communication in dual connectivity (DC) using antennas assigned to the two types of network communication and a method of operating the same.

Since the base station needs to determine precoding and/or beamforming of all terminals, the load on the base station may increase in a multi-user environment. In addition, signaling may be required for an operation of identifying an uplink (UL) channel for precoding and/or beamforming (for example, an operation in which the terminal transmits a sounding reference signal (SRS) to the base station) and an operation of notifying the terminal of the precoding and/or beamforming determined by the base station (for example, an operation in which the base station transmits an SRS resource indicator (SRI) to the terminal). However, the above-described signaling is control information, which may waste time/frequency resources capable of transmitting actual data (e.g., user data).

In addition, the terminal may split and use antennas for long-term evolution (LTE) and $5^{th}$-generation (5G) in evolved universal terrestrial radio access (E-UTRA) new radio dual connectivity (EN-DC) of the non-standalone (NSA) structure of new radio (NR). In this case, if data is transmitted and received only by one type of network communication, the antenna for the other type of network communication may be wasted.

Another aspect of the disclosure is to provide an electronic device that determines a precoder for uplink and a method of operating the same, and/or an electronic device capable of transmitting data of either one of both types of network communication in dual connectivity (DC) using antennas assigned to the two types of network communication and a method of operating the same.

Additional aspects will be set forth in part in the description which follows and, in part, will be apparent from the description, or may be learned by practice of the presented embodiments.

In accordance with an aspect of the disclosure, an electronic device is provided. The electronic device includes at least one communication processor, at least one radio frequency integrated circuit (RFIC) configured to convert data transmitted from the at least one communication processor into at least one radio frequency (RF) signal and output the at least one RF signal, and at least one antenna configured to receive each of the at least one RF signal and radiate an electromagnetic field, wherein the at least one communication processor is configured to receive, from a base station, a reference signal for identifying a state of a downlink channel between the electronic device and the base station through the at least one antenna and the at least one RFIC, based on the reference signal and association information between the downlink channel and an uplink channel between the electronic device and the base station, identify the uplink channel, based on the identified uplink channel, identify a precoder for the uplink channel, based on the identified precoder, precode uplink data and a demodulation reference signal (DMRS), and transmit a signal based on the precoded data to the base station using at least some of the at least one RFIC and the at least one antenna.

In accordance with another aspect of the disclosure, an electronic device is provided. The electronic device includes at least one radio frequency integrated circuit (RFIC) configured to convert data transmitted from the at least one communication processor into at least one radio frequency (RF) signal and output the at least one RF signal, and at least one antenna configured to receive each of the at least one RF signal and radiate an electromagnetic field, wherein the at least one communication processor is configured to receive, from a base station, a first reference signal for identifying a state of a downlink channel between the electronic device and the base station through the at least one antenna and the at least one RFIC, transmit a second reference signal for identifying a state of an uplink channel between the electronic device and the base station through the at least one antenna and the at least one RFIC, receive scheduling information identified by the base station based on the second reference signal, through the at least one antenna and the at least one RFIC, based on the first reference signal and association information between the downlink channel and the uplink channel between the electronic device and the base station, identify the uplink channel, based on the identified uplink channel, identify a precoder for the uplink channel, based on the scheduling information being determined to be used, transmit uplink data and a demodulation reference signal (DMRS) using the scheduling information, and based on the precoder being determined to be used, precode the uplink data and the DMRS using the precoder and transmit the precoded uplink data and the precoded DMRS.

In accordance with another aspect of the disclosure, an electronic device is provided. The electronic device includes at least one communication processor configured to support first network communication and second network communication, at least one first radio frequency integrated circuit (RFIC) configured to convert data transmitted from the at least one communication processor into at least one first radio frequency (RF) signal based on the first network communication and output the at least one first RF signal, at least one first antenna configured to receive each of the at least one first RF signal and radiate an electromagnetic field, at least one second RFIC configured to convert data transmitted from the at least one communication processor into at least one second RF signal based on the second network communication and output the at least one second RF signal, and at least one second antennas configured to receive each of the at least one second RF signal and radiate an electromagnetic field, wherein the at least one communication processor is configured to identify that the second network communication is inactive during a first period, identify a precoder corresponding to at least some of the at least one first antenna and the at least one second antenna which are to be used during the first period, precode uplink data and a demodulation reference signal (DMRS) based on the first network communication using the identified precoder, and output a signal based on the precoded data using at least some of the at least one first RFIC and the at least one second RFIC so as to transmit the signal using the at least some of the at least one first antenna and the at least one second antenna during the first period.

According to various embodiments, it is possible to provide an electronic device that determines a precoder for uplink and a method of operating the same. Accordingly, signaling for control is not required, so that a transmission speed of user data (e.g., a data transmission rate per hour and/or a response speed) may be improved. In addition, the electronic device is capable of actively adjusting the precoder.

According to various embodiments, it is possible to provide an electronic device capable of transmitting data of either one of two types of network communication in DC using antennas assigned to two types of network communication, and a method of operating the same. The rank of multi-input multi-output (MIMO) can be improved by using a larger number of antennas.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
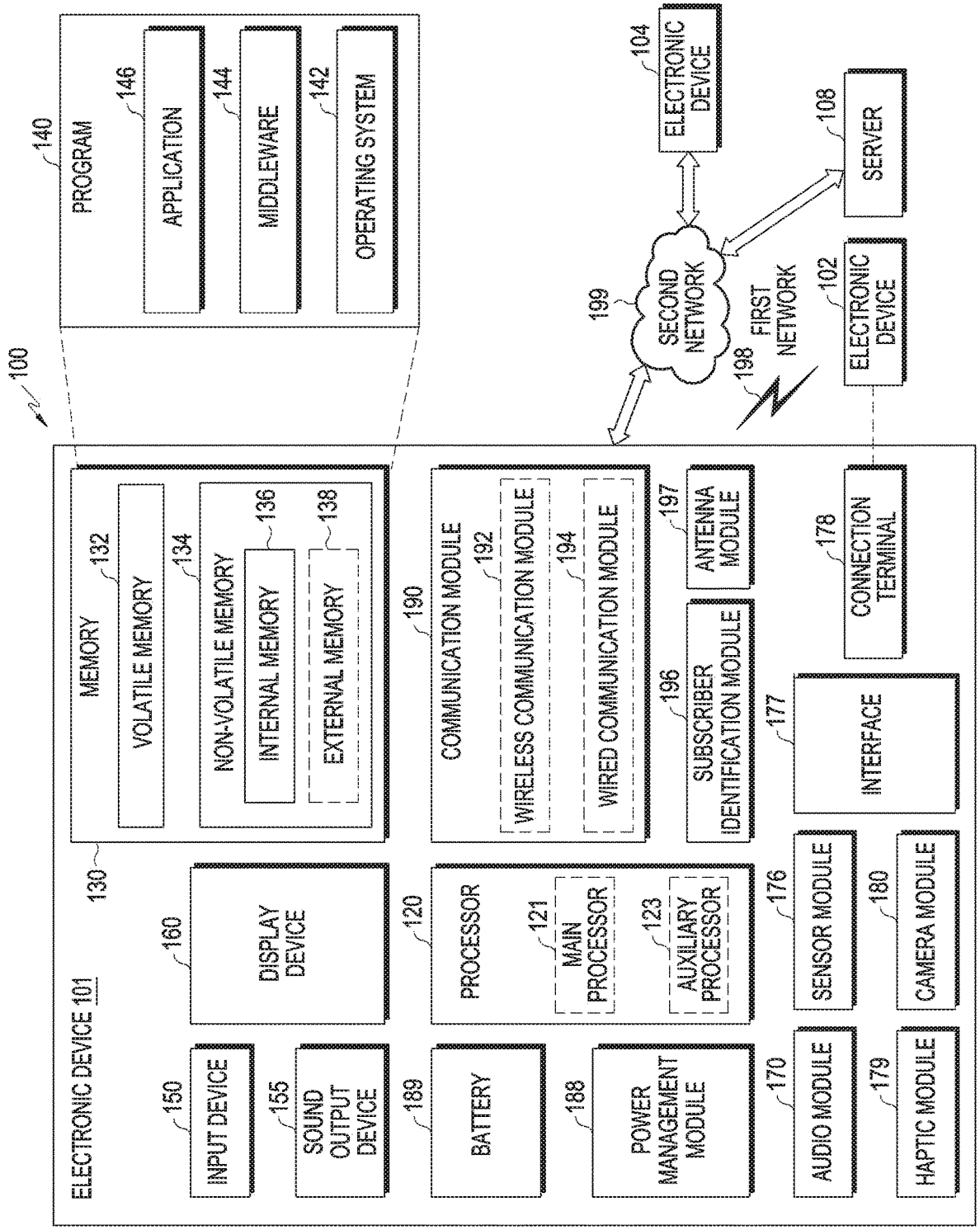
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
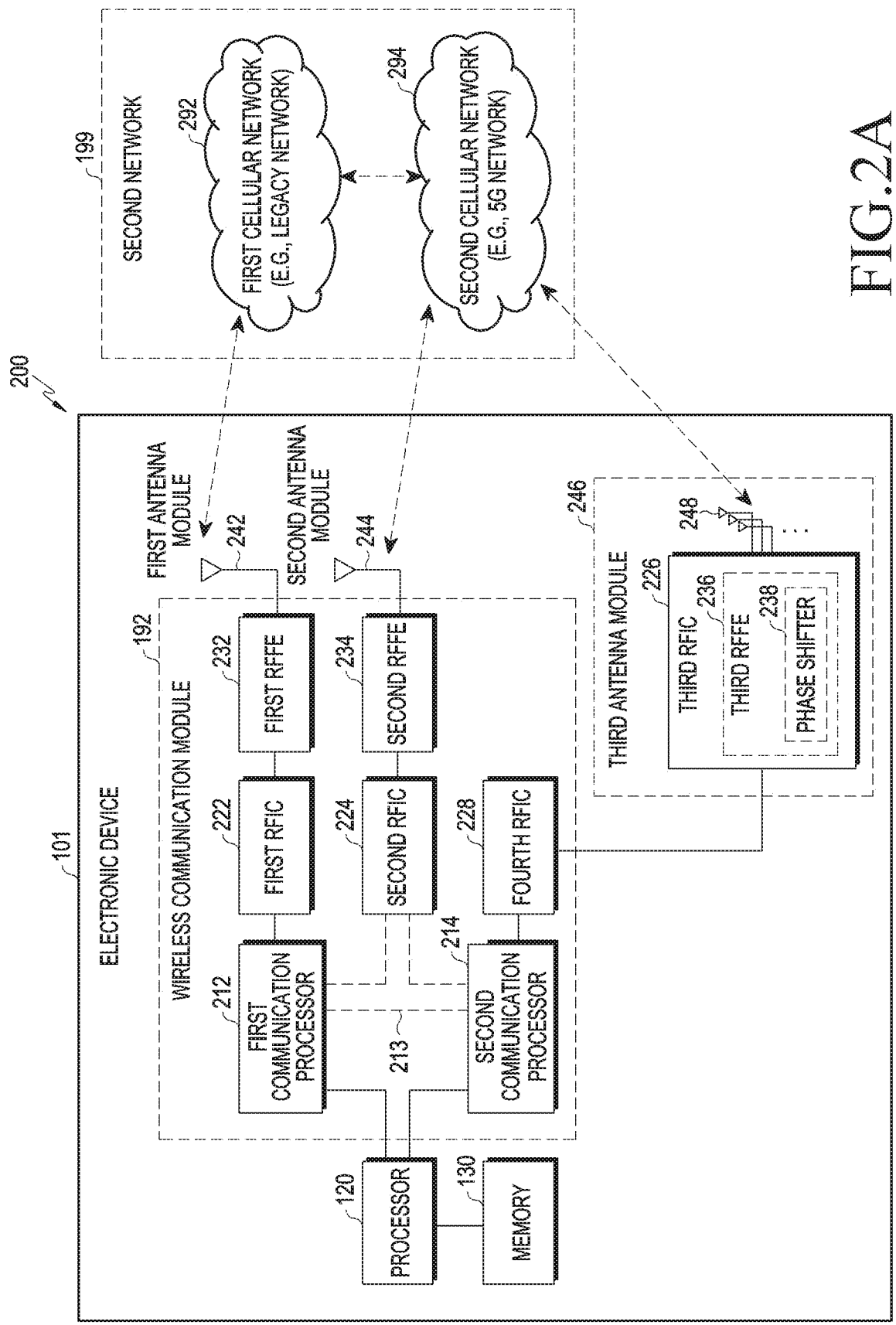
FIG. 2A is a block diagram of an electronic device for supporting legacy network communication and 5th generation (5G) network communication according to an embodiment of the disclosure.

FIG. 2A is a block diagram 200 of an electronic device 101 for supporting legacy network communication and 5G network communication according to an embodiment of the disclosure.

Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and antennas 248. The electronic device 101 may further include a processor 120 and a memory 130. A network 199 may include a first network 292 and a second network 294. According to another embodiment, the electronic device 101 may further include at least one of the components described with reference to FIG. 1, and the network 199 may further include at least one of other networks. According to an embodiment, the first communication processor 212, the second communication processor 214, the first RFIC 222, the second RFIC 224, the fourth RFIC 228, the first RFFE 232, and the second RFFE 234 may constitute at least a part of the wireless communication module 192. According to another embodiment, the fourth RFIC 228 may be omitted, or may be included as a part of the third RFIC 226.

The first communication processor 212 may support the establishment of a communication channel in a band to be used for wireless communication with the first network 292 and legacy network communication through the established communication channel. According to various embodiments, the first network may be a legacy network including a second generation 2G, 3G, 4G, or long-term evolution (LTE) network. The second communication processor 214 may support the establishment of a communication channel corresponding to a specified band (e.g., about 6 GHz to about 60 GHz), among the bands to be used for wireless communication with the second network 294, and 5G network communication through the established communication channel According to various embodiments, the second network 294 may be a 5G network defined in 3GPP. Additionally, according to an embodiment, the first communication processor 212 or the second communication processor 214 may support establishment of a communication channel corresponding to another specified band (e.g., about 6 GHz or below), among the bands to be used for wireless communication with the second network 294, and 5G network communication through the established communication channel.

The first communication processor 212 may transmit/receive data to/from the second communication processor 214. For example, the data that is intended to be transmitted through the second cellular network 294 may be transmitted through the first cellular network 292. In this case, the first communication processor 212 may receive data transmitted from the second communication processor 214.

For example, the first communication processor 212 may transmit/receive data to/from the second communication processor 214 through an inter-processor interface 213. The inter-processor interface 213 may be implemented as, for example, a universal asynchronous receiver/transmitter (UART) (e.g., a high-speed-UART (HS-UART)) or a peripheral component interconnect bus express (PCIe) interface, but it is not limited to a specific type. Alternatively, the first communication processor 212 and the second communication processor 214 may exchange control information and packet data information using, for example, a shared memory. The first communication processor 212 may transmit/receive various information, such as sensing information, information on output strength, and resource block (RB) allocation information, to/from the second communication processor 214.

Depending on the implementation, the first communication processor 212 may not be directly connected to the second communication processor 214. In this case, the first communication processor 212 may transmit/receive data to/from the second communication processor 214 through the processor 120 (e.g., an application processor). For example, the first communication processor 212 and the second communication processor 214 may transmit/receive data to/from each other through the processor 120 (e.g., an application processor), an HS-UART interface, or a PCIe interface, but the interface is not limited to a specific type. Alternatively, the first communication processor 212 and the second communication processor 214 may exchange control information and packet data information using the processor 120 (e.g., an application processor) and a shared memory.

According to an embodiment, the first communication processor 212 and the second communication processor 214 may be implemented in a single chip or a single package. According to various embodiments, the first communication processor 212 or the second communication processor 214 may be provided in a single chip or a single package together with the processor 120, the auxiliary processor 123, or the communication module 190.

Figure 2B:
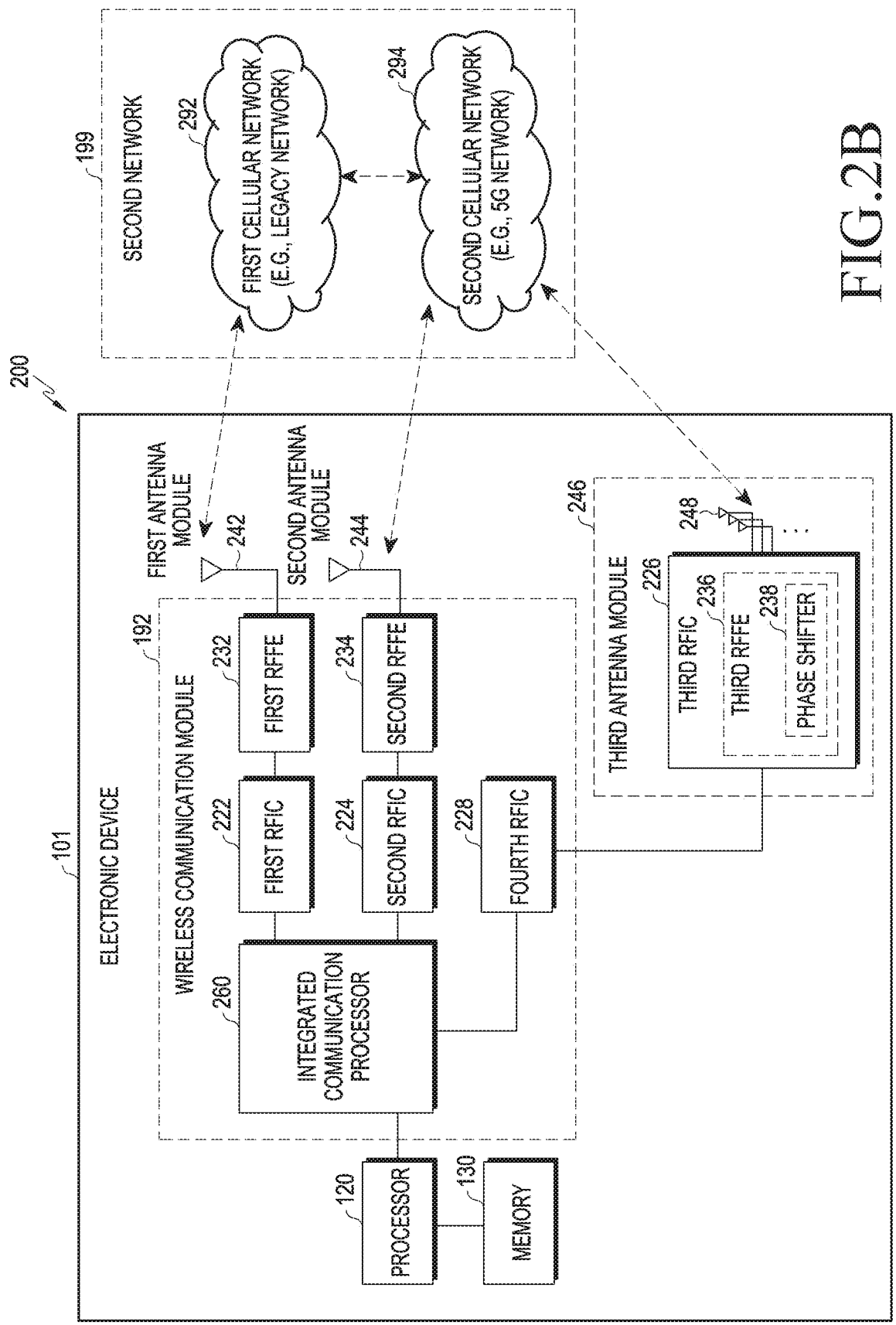
FIG. 2B is a block diagram of an electronic device for supporting legacy network communication and 5G network communication according to an embodiment of the disclosure.

FIG. 2B is a block diagram of an electronic device for supporting legacy network communication and 5G network communication according to an embodiment of the disclosure.

Referring to FIG. 2B, an integrated communication processor 260 may support functions for communication both with the first cellular network and with the second cellular network.

When transmitting a signal, the first RFIC 222 may convert a baseband signal generated by the first communication processor 212 into a radio frequency (RF) signal of about 700 MHz to about 3 GHz used in the first network 292 (e.g., a legacy network). When receiving a signal, an RF signal may be obtained from the first network 292 (e.g., a legacy network) through an antenna (e.g., the first antenna module 242), and may be preprocessed through an RFFE (e.g., the first RFFE 232). The first RFIC 222 may convert the preprocessed RF signal into a baseband signal so as to be processed by the first communication processor 212.

When transmitting a signal, the second RFIC 224 may convert a baseband signal generated by the first communication processor 212 or the second communication processor 214 into an RF signal of a Sub-6 band (e.g., about 6 GHz or less) (hereinafter, referred to as a "5G Sub-6 RF signal") used in the second network 294 (e.g., a 5G network). When receiving a signal, a 5G Sub-6 RF signal may be obtained from the second network 294 (e.g., a 5G network) through an antenna (e.g., the second antenna module 244), and may be preprocessed through an RFFE (e.g., the second RFFE 234). The second RFIC 224 may convert the preprocessed 5G Sub-6 RF signal into a baseband signal so as to be processed by the corresponding communication processor, among the first communication processor 212 or the second communication processor 214.

The third RFIC 226 may convert a baseband signal generated by the second communication processor 214 into an RF signal in a 5G Above-6 band (e.g., about 6 GHz to about 60 GHz) (hereinafter, referred to as a "5G Above-6 RF signal") to be used in the second network 294 (e.g., a 5G network). When receiving a signal, the 5G Above-6 RF signal may be obtained from the second network 294 (e.g., a 5G network) through an antenna (e.g., the antenna 248), and may be preprocessed by the third RFFE 236. The third RFIC 226 may convert the preprocessed 5G Above-6 RF signal into a baseband signal so as to be processed by the second communication processor 214. According to an embodiment, the third RFFE 236 may be configured as a part of the third RFIC 226.

According to an embodiment, the electronic device 101 may include the fourth RFIC 228 separately from the third RFIC 226 or as at least a part thereof. In this case, the fourth RFIC 228 may convert the baseband signal generated by the second communication processor 214 into an RF signal (hereinafter, referred to as an "IF signal") in an intermediate frequency band (e.g., about 9 GHz to about 11 GHz), and may transmit the IF signal to the third RFIC 226. The third RFIC 226 may convert the IF signal into a 5G-Above 6 RF signal. When receiving a signal, the 5G Above-6 RF signal may be received from the second network 294 (e.g., a 5G network) through an antenna (e.g., the antenna 248), and may be converted to an IF signal by the third RFIC 226. The fourth RFIC 228 may convert the IF signal into a baseband signal so as to be processed by the second communication processor 214.

According to an embodiment, the first RFIC 222 and the second RFIC 224 may be implemented as a single chip or at least a part of a single package. According to an embodiment, the first RFFE 232 and the second RFFE 234 may be implemented as a single chip or at least a part of a single package. According to an embodiment, at least one of the first antenna module 242 or the second antenna module 244 may be omitted, or may be combined with another antenna module, thereby processing RF signals in a plurality of corresponding bands.

According to an embodiment, the third RFIC 226 and the antenna 248 may be disposed on the same substrate, thereby configuring the third antenna module 246. For example, the wireless communication module 192 or the processor 120 may be disposed on a first substrate (e.g., a main PCB). In this case, the third RFIC 226 may be disposed on a portion (e.g., a lower surface) of the second substrate (e.g., a sub-PCB) separately from the first substrate, and the antenna 248 may be disposed in another portion (e.g., an upper surface) thereof, thereby configuring the third antenna module 246. It is possible to reduce the length of the transmission line between the third RFIC 226 and the antenna 248 by arranging the same on the same substrate. This may reduce, for example, the loss (e.g., attenuation) of a signal in a high-frequency band (e.g., about 6 GHz to about 60 GHz) used in 5G network communication attributable to the transmission line. As a result, the electronic device 101 may improve the quality or speed of communication with the second network 294 (e.g., a 5G network).

According to an example, the antenna 248 may be configured as an antenna array including a plurality of antenna elements that may be used in beamforming. In this case, the third RFIC 226 may include a plurality of phase shifters 238 corresponding to a plurality of antenna elements, for example, as part of the third RFFE 236. When transmitting a signal, each of the plurality of phase shifters 238 may convert the phase of a 5G Above-6 RF signal to be transmitted to the outside of the electronic device 101 (e.g., a base station in a 5G network) through a corresponding antenna element. When receiving a signal, each of the plurality of phase shifters 238 may convert the phase of the 5G Above-6 RF signal received from the outside through a corresponding antenna element into the same or substantially the same phase. This enables transmission or reception between the electronic device 101 and the outside through beamforming.

The second network 294 (e.g., a 5G network) may operate independently of the first network 292 (e.g., a legacy network) (for example, a standalone (SA) network), or may operate while being connected thereto (for example, a non-standalone (NSA) network). For example, the 5G network may have only an access network (e.g., a 5G radio access network (RAN) or a next-generation RAN (NG RAN)), and may have no core network (e.g., a next-generation core (NGC)). In this case, the electronic device 101 may access the access network of the 5G network, and may then access an external network (e.g., the Internet) under the control of the core network (e.g., an evolved packed core (EPC)) of the legacy network. Protocol information for communication with a legacy network (e.g., LTE protocol information) or protocol information for communication with a 5G network (e.g., new radio (NR) protocol information) may be stored in the memory 230, so that other components (e.g., the processors 120, the first communication processor 212, or the second communication processor 214) may access the memory.

According to various embodiments, the second communication processor 214 may be connected to the first RFIC 222, which will be described with reference to FIG. 11.

The term "base station" may be replaced by "enhanced Node B (eNB)", "general node B (gNB)", or "access point". Based on the type of network, another well-known term such as "base station" or "access point" may be used in place of "gNB" or "BS". For convenience, the term "gNB" or "BS" may indicate a network infrastructure component that provides wireless access to remote terminals in the disclosure. Further, based on the type of network, the term "electronic device" may be replaced with "mobile station", "subscriber station", "remote terminal", "wireless terminal", "user device", or "user equipment". For convenience, the terms "user terminal" and "UE" may indicate remote wireless terminals that wirelessly access the gNB in the disclosure.

Figure 3A:
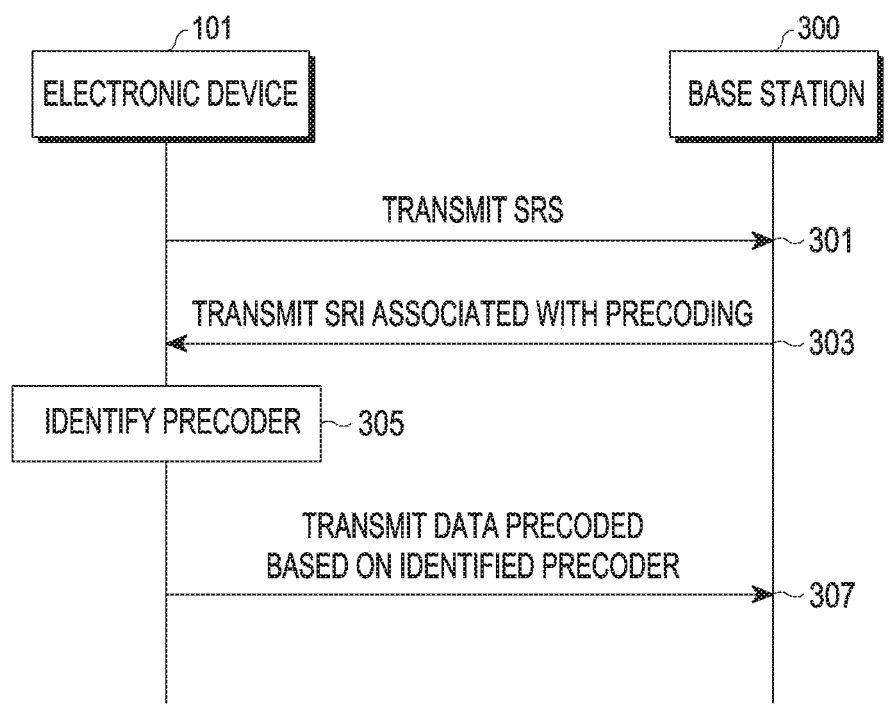
FIG. 3A is a flowchart illustrating a method of operating an electronic device and a base station according to an embodiment of the disclosure.

FIG. 3A is a flowchart illustrating a method of operating an electronic device and a base station according to an embodiment of the disclosure.

Referring to FIG. 3A, according to a comparative example, in operation 301, an electronic device 101 (e.g., at least one of the first communication processor 212 in FIG. 2A, the second communication processor 234 in FIG. 2A, and the integrated communication processor 260 in FIG. 2B) may transmit an SRS to a base station 300. For example, the electronic device 101 may transmit the SRS in specified symbols of a slot (e.g., the last symbol of a slot in the case of LTE and the last 6 symbols of a slot in the case of NR) according to a specific period. The electronic device 101 may identify SRS configuration through RRC messages (e.g., RRC connection setup and/or RRC connection reconfiguration).

The base station 300 may identify the quality of an uplink path channel (for example, may predict channel information), based on the SRS. The base station may identify precoding information for the uplink of the electronic device 101, based on the predicted channel information. In the case of codebook-based precoding, the base station 300 may estimate the UL channel, based on the SRS, and may identify one precoder to be used by the terminal, among the precoder set agreed upon with the electronic device 101 in advance. In the case of non-codebook-based precoding, the electronic device 101 may apply respective ones of the plurality of codebooks to the respective SRSs, and the base station 300 may select the precoded and/or beamformed SRS resource that is most suitable for UL data transmission.

In operation 303, the base station 300 may transmit an SRI associated with precoding to the electronic device 101. For example, in the case of non-codebook-based precoding, the base station 300 may transmit an SRI indicating the selected SRS resource to the electronic device 101. For example, in the case of codebook-based precoding, the base station 300 may transmit a transmitted precoding matrix indicator (TPMI) to the electronic device 101. The base station 300 may transmit a transmission rank. In operation 305, the electronic device 101 may identify a precoder, based on at least one of the SRI, the TPMI, or the transmission rank associated with the received precoding. Alternatively, the electronic device 101 may identify the precoder, based on the TPMI. In operation 307, the electronic device 101 may transmit, to the base station 300, data precoded based on the identified precoder.

According to various embodiments, in the case of codebook-based transmission, if a physical uplink shared channel (PUSCH) is scheduled according to DCI format 0_1, the electronic device 101 may identify a PUSCH transmission precoder, based on an SRI, a TPMI, and a transmission rank. The TPMI may indicate the precoder to be applied to an antenna port, and, in the case where a plurality of SRS resources are arranged, may correspond to the SRS selected by the SRI. In the case where a single SRS resource is configured, the TPMI may indicate the precoder to be applied to the antenna port, and may correspond to the SRS resource. The transmission precoder may be selected from the uplink codebook, and the uplink codebook may include the same antennas as the higher-level parameter "nrofSRS"-ports in "SRS-config", which may be defined according to 6.3.1.5 of TS 38.211. In the case where the higher-level parameter "txConfig" is configured as a "codebook", the electronic device 101 may perform uplink transmission, based on the codebook. For example, the electronic device 101 may transmit SRS resources each having multiple SRS ports to N base stations, and the base station may select one of them, thereby transmitting notification thereof to the electronic device 101 through an SRI. The SRI may be used to indicate uplink beams. The electronic device 101 may select and use an uplink beam corresponding to the SRS resource. In the codebook-based transmission, the electronic device 101 may select codebook subsets, based on the TPMI. In the non-codebook-based transmission, the electronic device 101 may configure a PUSCH precoder and a transmission rank, based on a wideband SRI (wide SRI) in the case where a plurality of SRS resources are configured. In the non-codebook-based transmission, the electronic device 101 may obtain a precoder for transmitting the precoded SRS, based on the measurement associated with the non-zero power (NZP) CSI-RS resource. The electronic device 101 may perform one-to-one mapping between the indicated SRIs and the DM-RS ports in the DCI format in increasing order.

According to a comparative example, in order to select a precoder of the base station 300, the electronic device 101 must transmit an SRS, and the base station 300 may need to transmit information associated with the selected precoder to the electronic device 101. Accordingly, the electronic device 101 must allocate resources capable of transmitting data for the transmission and reception of control data for precoder configuration, so that data transmission may be delayed. In addition, it may be impossible for the electronic device 101 to select a precoder according to existing standard.

Figure 3B:
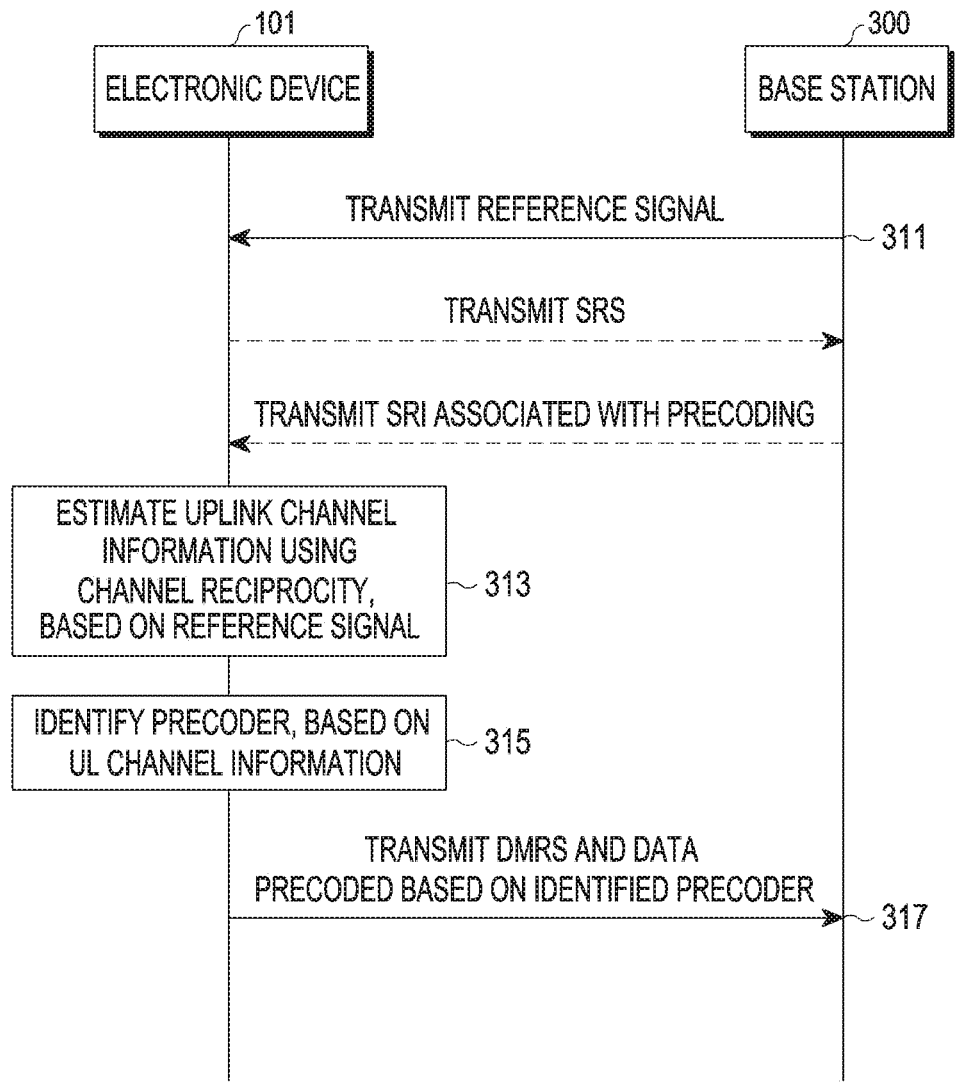
FIG. 3B is a flowchart illustrating a method of operating an electronic device according to an embodiment of the disclosure.

FIG. 3B is a flowchart illustrating a method of operating an electronic device according to an embodiment of the disclosure.

Referring to FIG. 3B, a base station 300 may transmit a reference signal to an electronic device 101 in operation 311. The electronic device 101 (e.g., at least one of the first communication processor 212, the second communication processor 234, and the integrated communication processor 260) may receive a reference signal from the base station 300. For example, the electronic device 101 may receive a downlink channel state information-reference signal (DL CSI-RS) from the base station 300, but the signal is not limited to a specific type, as long as it is a signal able to be used in prediction of a channel (e.g., a cell-specific reference signal (CRS)).

According to various embodiments, in operation 313, the electronic device 101 may estimate uplink channel information using channel reciprocity, based on the reference signal. In operation 315, the electronic device 101 may identify the precoder, based on the UL channel information. For example, the electronic device 101 may identify at least one of reference signal received power (RSRP), reference signal received quality (RSRQ), or pathloss of the reference signal, and may estimate downlink channel information, based on the identified result. However, the method of estimating the downlink channel information is not limited thereto. The electronic device 101 may estimate uplink channel information, based on UL-DL channel reciprocity. If UL-DL channel reciprocity is feasible with respect to, for example, time division duplex (TDD) scenarios, the electronic device 101 may estimate UL channel information by measuring the DL CSI-RS. In this case, the electronic device 101 may calculate its own unique precoder for a given resource allocation. Alternatively, the electronic device 101 may use a UL channel estimation value for selecting a precoder from a precoder subset (or group). In various embodiments, the precoder identified by the electronic device 101 may include a precoding matrix (or vector) and/or a beam-former for MIMO.

According to various embodiments, in operation 317, the electronic device 101 may transmit a precoded demodulation reference signal (DMRS) and data, based on the identified precoder. The electronic device 101 may perform precoding, based on the precoder calculated or selected by the electronic device 101. The electronic device 101 may obtain a codeword by performing channel coding on the data for transmission, and may modulate the codeword into a symbol representing a position in a signal constellation. In various embodiments, it will be readily understood by those skilled in the art that performing precoding on UL data by the electronic device 101 denotes performing precoding on modulation symbols. In addition, it will be apparent to those skilled in the art that the transmission of UL data (or a DMRS) by the electronic device 101 may include an operation of converting a precoded vector into an RF signal and radiating electromagnetic waves through an antenna.

According to various embodiments, the electronic device 101 may precode UL data and a DMRS using the same precoder. The base station 300 may use a DMRS for the operation of demodulating the UL data. For example, the base station 300 may estimate the product of a UL channel and a precoder at once, based on the DMRS, and may identify a modulation symbol, based on the estimated result. Meanwhile, in various embodiments, the electronic device 101 may transmit information associated with precoding to the base station 300 through control signaling. In this case, the electronic device 101 may precode only the UL data, and may transmit the same to the base station 300. The base station 300 may identify a symbol vector, based on the received information associated with the precoding.

In various embodiments, according to the above-described operation, the operation of transmitting the SRS by the electronic device 101 and the operation of transmitting the SRI associated with the precoding by the base station 300 may be omitted. In addition, the electronic device 101 may actively perform precoding. The operation in which the electronic device 101 independently performs precoding as described above may be referred to as "network (NW)-assistance-free UL MIMO" or "UE-based UL MIMO". In addition, the electronic device 101 according to various embodiments may determine a precoder independently if specified conditions are satisfied, but the electronic device 101 may be configured, if specified conditions are not satisfied, to perform precoding, based on the precoder received from the base station 300 according to 3GPP TS 38.214. Precoding based on the precoder received from the base station 300 may also be referred to as "network-assistance UL MIMO". Various embodiments of the specified conditions described above will be described later.

Figure 4A:
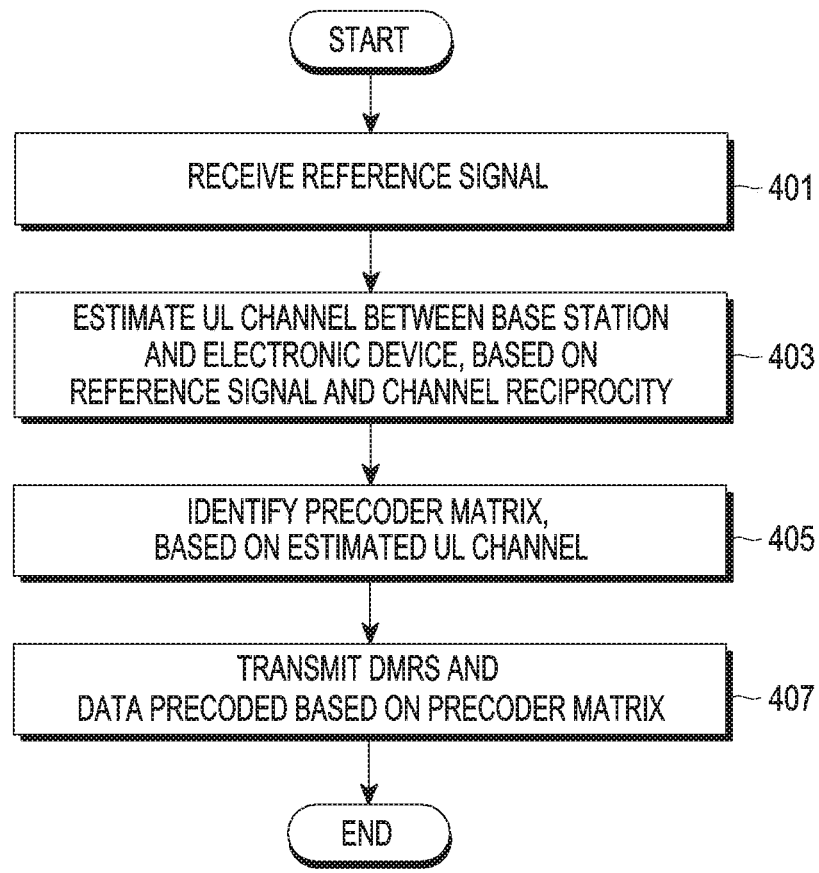
FIG. 4A is a flowchart illustrating a method of operating an electronic device according to an embodiment of the disclosure.

FIG. 4A is a flowchart illustrating a method of operating an electronic device according to an embodiment of the disclosure.

Referring to FIG. 4A, an electronic device 101 (e.g., at least one of the first communication processor 212 in FIG. 2A, the second communication processor 234 in FIG. 2A, and the integrated communication processor 260 in FIG. 2B) may receive a reference signal (e.g., DL CSI-RS) from a base station 300 in operation 401. In operation 403, the electronic device 101 may estimate a UL channel between the base station 300 and the electronic device 101, based on the reference signal and channel reciprocity. In operation 405, the electronic device 101 may identify a precoder matrix (or vector), based on the estimated UL channel. For example, the electronic device 101 may identify a precoder matrix, based on at least some of the matrices obtained by decomposing the estimated UL channel according to singular value decomposition (SVD). In the case where the matrix (or vector) representing the UL channel is represented by "H", "H" may be decomposed as shown in Equation 1.

$$H = U\Sigma V^H \quad \text{Equation 1}$$

U and V are unitary matrices, and $\Sigma$ is a diagonal matrix. $V^H$ may be a Hermitian matrix of V. The electronic device 101 may configure a submatrix including at least some columns of the unitary matrix V as a precoder matrix. In the case where the submatrix including at least some columns of the unitary matrix V is configured as a precoder matrix, the vector product of $U^H$ and the reception signal vector in the base station 300 may be simply expressed as the sum of the vector product between $\Sigma$ and the modulation symbol and noise. Since $\Sigma$ is a diagonal matrix, the amount of calculation required for the estimation of the modulation symbol may be reduced. In operation 407, the electronic device 101 may transmit the DMRS and data precoded based on the precoder matrix.

Figure 4B:
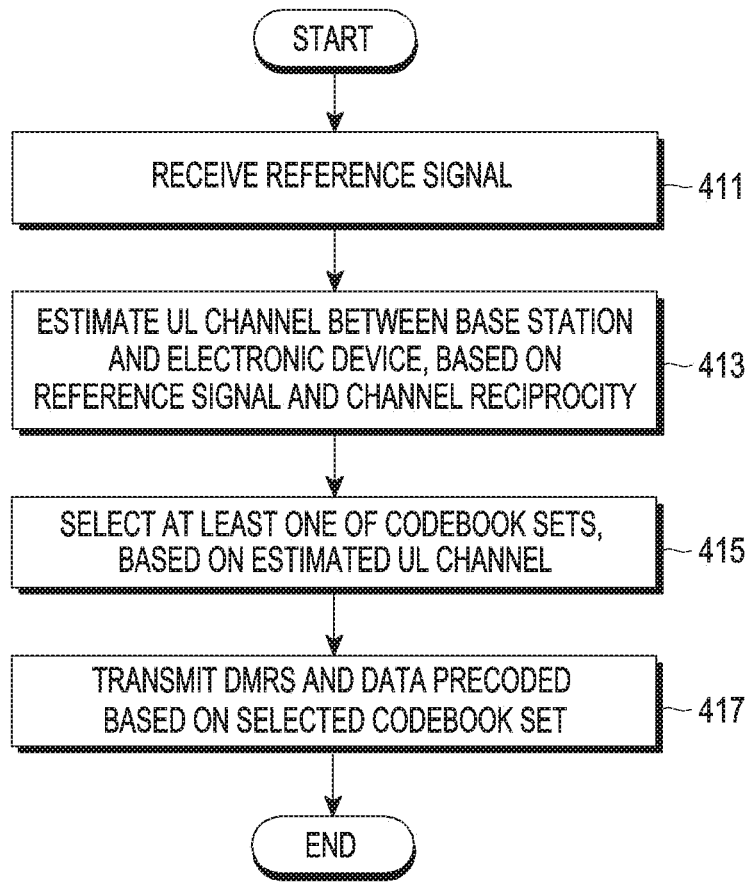
FIG. 4B is a flowchart illustrating a method of operating an electronic device according to an embodiment of the disclosure.

FIG. 4B is a flowchart illustrating a method of operating an electronic device according to an embodiment of the disclosure.

Referring to FIG. 4B, an electronic device 101 (e.g., at least one of the first communication processor 212, the second communication processor 234, and the integrated communication processor 260) may receive a reference signal (e.g., DL CSI-RS) from a base station 300 in operation 411. In operation 413, the electronic device 101 may estimate a UL channel between the base station 300 and the electronic device 101, based on the reference signal and channel reciprocity. In operation 415, the electronic device 101 may select at least one precoder of a codebook set, based on the estimated UL channel. For example, the electronic device 101 may pre-store a codebook set defined for codebook-based UL transmission in 3GPP. For example, the electronic device 101 may select, as a precoder, a codebook for maximizing achievable sum throughput in all bands with respect to the estimated UL channel, but it will be readily understood by those skilled in the art that the criteria for selecting the codebook are not limited. In operation 417, the electronic device 101 may transmit the DMRS and data precoded based on the selected codebook set.

Figure 5:
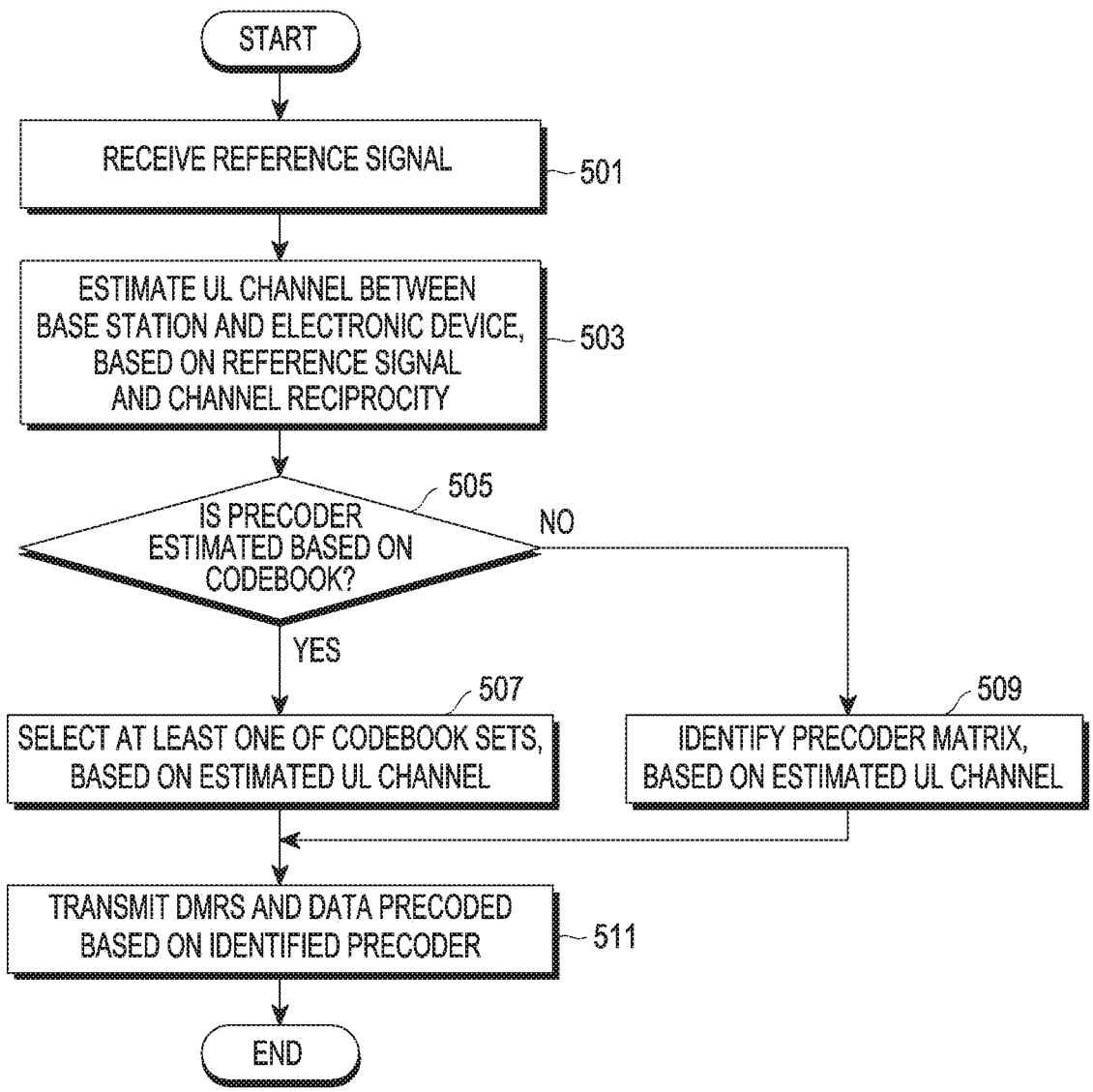
FIG. 5 is a flowchart illustrating a method of operating an electronic device according to an embodiment of the disclosure.

FIG. 5 is a flowchart illustrating a method of operating an electronic device according to an embodiment of the disclosure.

Referring to FIG. 5, an electronic device 101 (e.g., at least one of the first communication processor 212, the second communication processor 234, and the integrated communication processor 260) may receive a reference signal (e.g., DL CSI-RS) from a base station 300 in operation 501. In operation 503, the electronic device 101 may estimate a UL channel between the base station 300 and the electronic device 101, based on the reference signal and channel reciprocity.

According to various embodiments, in operation 505, the electronic device 101 may identify whether or not to estimate a precoder, based on a codebook. The electronic device 101 may identify whether or not to estimate the precoder, based on the codebook, depending on whether or not specified conditions are satisfied. For example, according to various embodiments, the electronic device 101 may predict and/or compare the performance between the case in which the estimated UL channel information (H) and the precoder (W) selected based on the codebook using the estimated UL channel information are used and the case in which the estimated UL channel information (H) and the precoder (W) are not used. If the difference in the performance is greater than or equal to a specific threshold, the electronic device 101 may operate based on the codebook, and if the difference in the performance is less than the threshold, the electronic device 101 may operate on a non-codebook basis. Alternatively, the electronic device 101 may be configured to operate on a codebook basis in the case where reduction of power consumption is required (for example, in the case where the battery level is less than or equal to a threshold). Alternatively, the electronic device 101 may be configured to operate on a codebook basis in the case where the precoder is required to be determined quickly. Alternatively, if the performance of a processor is less than or equal to a threshold (or if an idle resource is less than or equal to a threshold), the electronic device 101 may operate on a codebook basis.

According to various embodiments, if it is identified that the precoder is to be estimated based on the codebook ("Yes" in operation 505), the electronic device 101 may select at least one of codebook sets, based on the estimated UL channel in operation 507. If it is identified that the precoder is not to be estimated based on the codebook ("No" in operation 505), the electronic device 101 may identify a precoder matrix, based on the estimated UL channel in operation 509. In operation 511, the electronic device 101 may transmit a DMRS and data precoded based on the identified precoder.

According to various embodiments, the electronic device 101 may be configured to, if at least some of the above conditions are satisfied, independently perform precoding, for example, even if the electronic device 101 receives, from the base station 300, an instruction not to perform precoding. For example, even if the electronic device 101 receives, from the base station 300, first-layer scheduling information, does not receive an SRS request, or receives an SRI indicating that precoding is not to be performed, the electronic device 101 may independently identify the precoder. In addition, even if the electronic device 101 receives precoding information from the base station 300, the electronic device 101 may ignore the information, and may perform precoding using the precoder independently calculated (or selected) by the electronic device 101.

Figure 6:
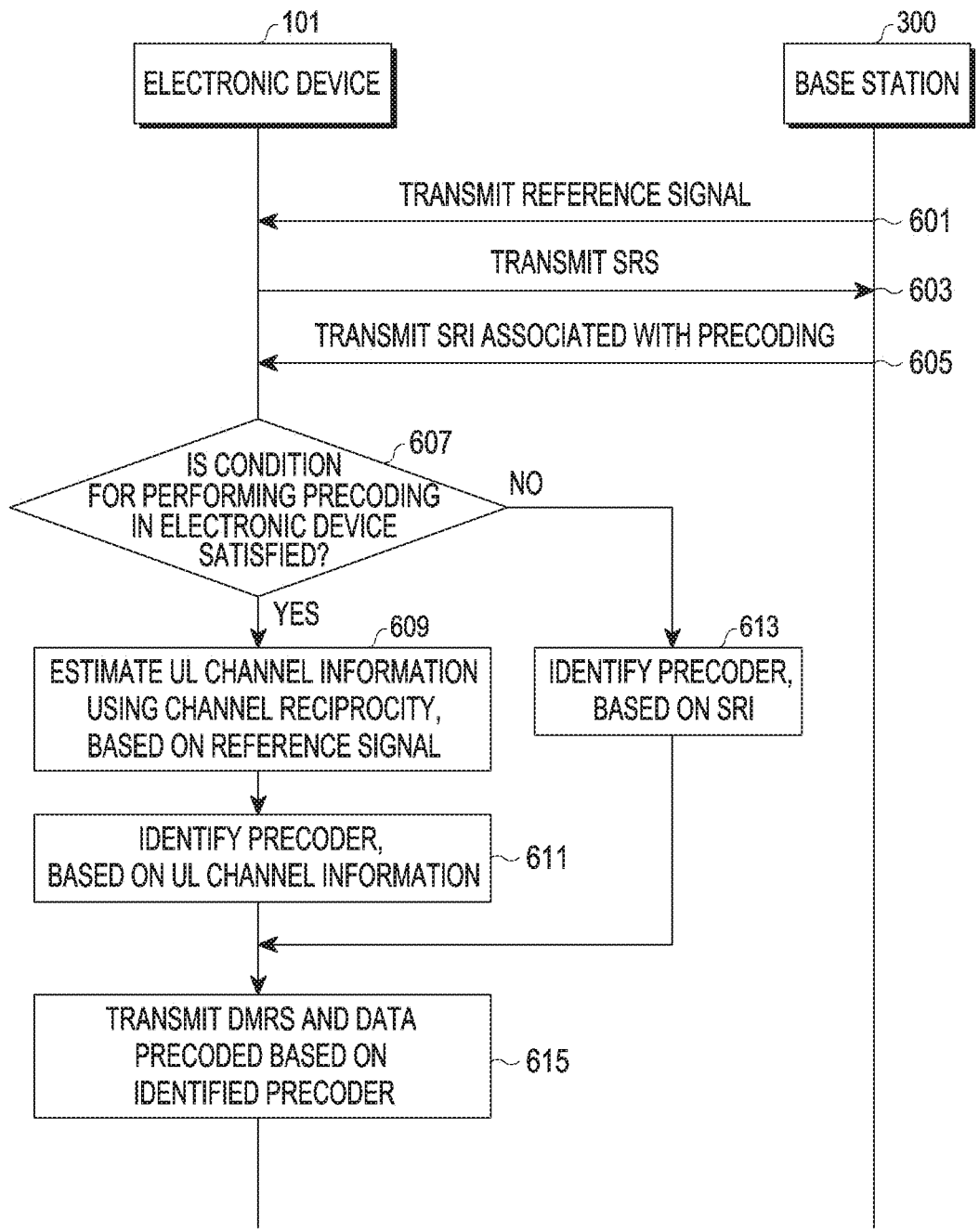
FIG. 6 is a flowchart illustrating a method of operating an electronic device and a base station according to an embodiment of the disclosure.

FIG. 6 is a flowchart illustrating a method of operating an electronic device and a base station according to an embodiment of the disclosure.

Referring to FIG. 6, in operation 601, a base station 300 may transmit a reference signal (e.g., DL CSI-RS). In operation 603, the electronic device 101 may transmit an SRS to the base station 300. In operation 605, the base station 300 may transmit an SRI (or TPMI) associated with the precoding.

According to various embodiments, an electronic device 101 (e.g., at least one of the first communication processor 212, the second communication processor 214, and the integrated communication processor 260) may identify whether or not conditions for performing precoding in the electronic device are satisfied in operation 607. The conditions may be associated with at least one of UL scheduling information, link quality, antenna status, or prediction reliability of the UL channel, but the type thereof is not limited. Various embodiments of the respective conditions will be described in more detail with reference to FIGS. 8A to 8D.

According to various embodiments, if it is identified that the configured conditions are satisfied ("Yes" in operation 607), the electronic device 101 may estimate UL channel information using channel reciprocity, based on the reference signal in operation 609. In operation 611, the electronic device 101 may identify (or select) a precoder, based on the UL channel information. As described above, the electronic device 101 may identify the precoder according to any one of a codebook-based method and a non-codebook-based method. If it is identified that the configured conditions are not satisfied ("No" in operation 607), the electronic device 101 may identify the precoder, based on the SRI (or TPMI) in operation 613. In operation 615, the electronic device 101 may transmit a DMRS and data precoded based on the identified precoder.

Figure 7A:
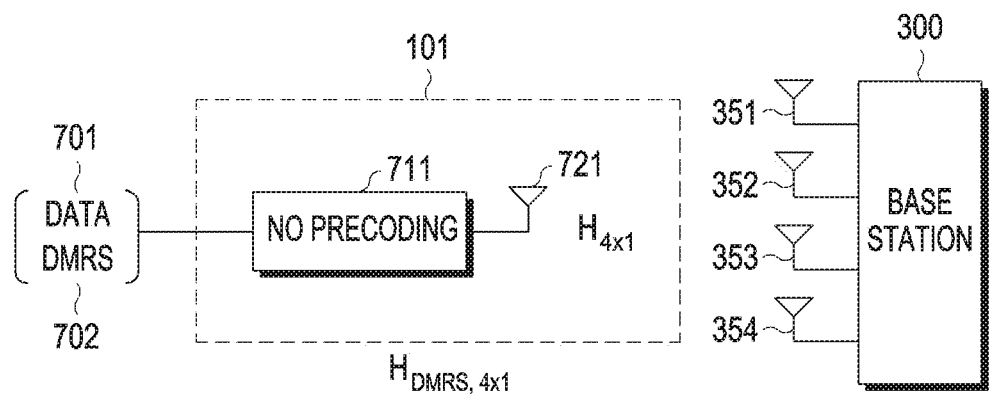
FIG. 7A is a diagram illustrating precoding according to a received precoder according to an embodiment of the disclosure.

FIG. 7A is a diagram illustrating precoding according to a received precoder according to an embodiment of the disclosure.

Figure 7B:
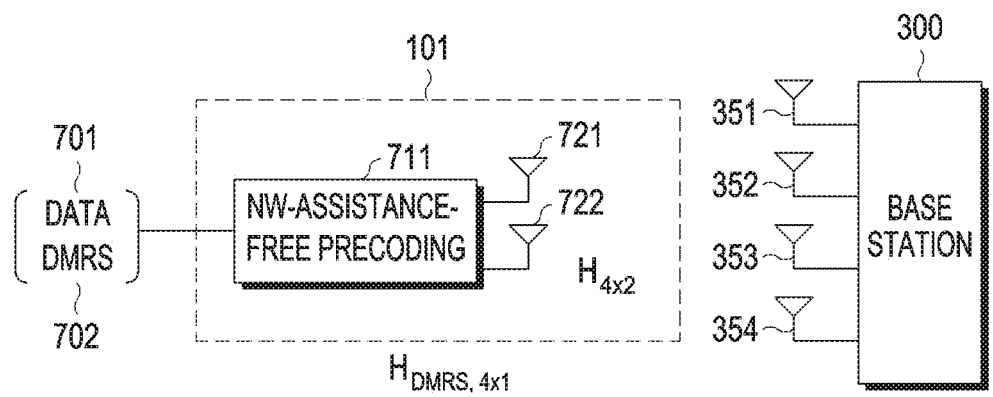
FIG. 7B is a diagram illustrating precoding according to an identified precoder according to an embodiment of the disclosure.

FIG. 7B is a diagram illustrating precoding according to an identified precoder according to an embodiment of the disclosure.

Referring to FIG. 7A, an electronic device 101 (e.g., the electronic device 101 in FIG. 1) may receive one-layer and one-port precoding information from a base station 300. If it is identified that configured conditions are not satisfied, the electronic device 101 may perform precoding, based on the precoding information received from the base station 300. As shown in FIG. 7A, the electronic device 101 may input a modulation symbol corresponding to the data 701 and the DMRS 702 for uplink into a precoding block 711. The precoding block 711 may output the modulation symbol without precoding the same to an antenna port corresponding to a single antenna 721 according to precoding corresponding to the one layer and the one port (e.g., no precoding). A transmission signal from the antenna 721 may be transmitted through a first channel environment ($H_{4\times 1}$), and the base station 300 may receive the transmission signal through at least one antenna 351, 352, 353, or 354. The matrix that reflects both the precoding and the channel environment may be expressed as "$H_{DMRS,4\times 1}$". The base station 300 may identify transmission bits from the received transmission signals, based on the precoding information having been transmitted to the electronic device 101 or based on the DMRS. Meanwhile, the channel environment using the four antennas above is only an example, and it will be readily understood by those skilled in the art that the number of antennas is not limited.

Referring to FIG. 7B, the electronic device 101 may determine to perform network-assistance-free UL MIMO. The electronic device 101 may identify that configured conditions are satisfied, and may identify a precoder, based on the DL CSI-RS. For example, the electronic device 101 may determine the precoder different from the precoding information received from the base station 300. For example, the electronic device 101 may determine a two-port precoder, and the precoding block 711 may perform network (NW)-assistance-free precoding on the modulation symbol corresponding to the data 701 and the DMRS 702 for uplink, thereby outputting the same to the antenna ports corresponding to two antennas 721 and 722. The channel environment using the two antennas above is only an example, and it will be readily understood by those skilled in the art that the number of antennas is not limited. Transmission signals from the antennas 721 and 722 may be transmitted through a second channel environment ($H_{4\times 2}$), and the base station 300 may receive the transmission signals through at least one antenna 351, 352, 353, or 354. The matrix that reflects both the precoding and the channel environment may be expressed as "$H_{DMRS,4\times 1}$". The base station 300 may identify transmission bits, based on the DMRS. Since the DMRS is transmitted through the same effective channel as the UL data, the base station 300 may identify the UL data using the channel estimated based on the DMRS. Although not shown, the electronic device 101 may receive one-layer and two-port codebook-based precoding information from the base station 300, but may ignore the precoding information and use a precoder corresponding to four ports. Alternatively, the electronic device 101 may be scheduled to perform non-codebook-based precoding by the base station 300. In this case, although the electronic device 101 receives an instruction to perform precoding using the same number of ports as the number of layers (or a specified number of ports), the electronic device 101 may ignore the instruction, and may perform precoding corresponding to the same number of ports as the number of layers or a greater or smaller number of ports than the number of layers, thereby transmitting data. The electronic device 101 according to various embodiments may perform one of either the precoding based on the precoding information received from the base station 300 or the precoding based on the precoding information determined by the electronic device 101, depending on whether or not the configured conditions are satisfied. The base station 300 may be configured so as to switch the precoder during the transmission of data.

According to various embodiments, the conditions for the electronic device 101 to select whether to use the precoding information received from the base station 300 or the precoding information determined by the electronic device 101 will be described with reference to FIGS. 8A to 8D. Various conditions may be used alone, or may be used as at least a combination thereof.

Figure 8A:
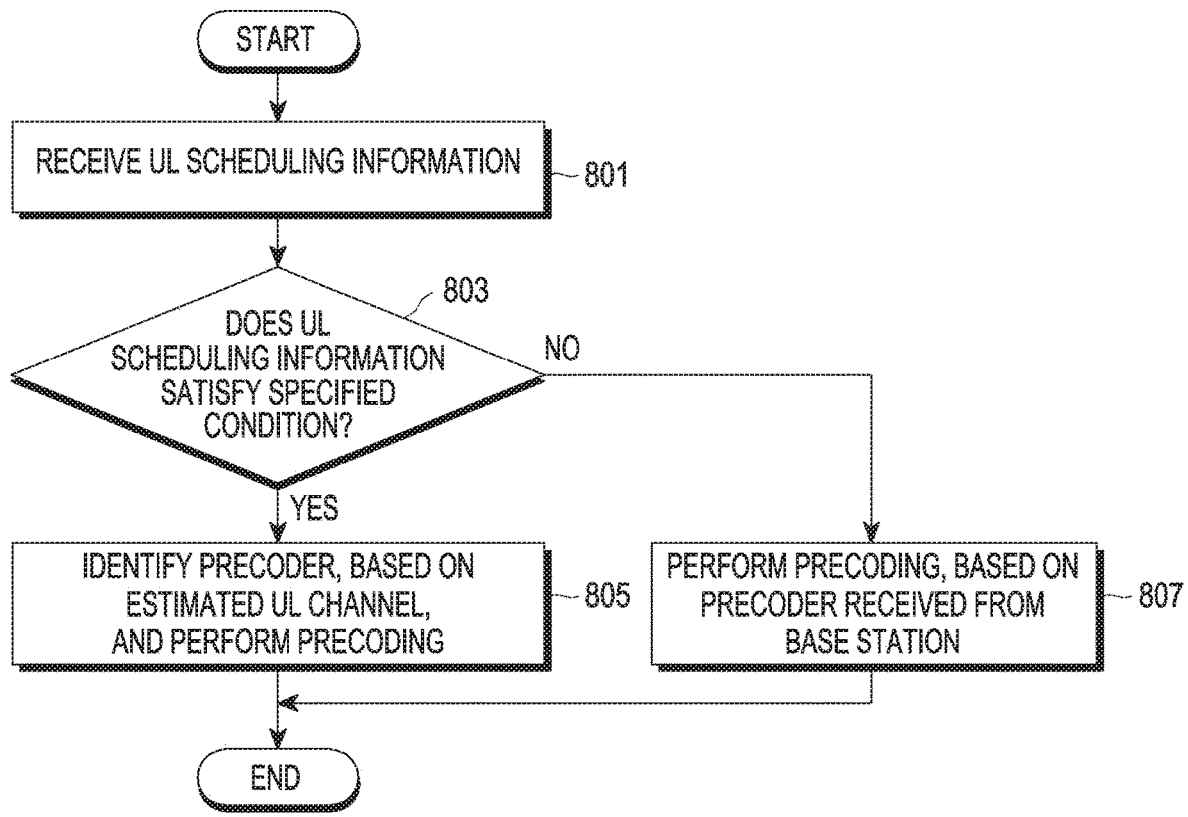
FIG. 8A is a flowchart illustrating a method of operating an electronic device according to an embodiment of the disclosure.

FIG. 8A is a flowchart illustrating a method of operating an electronic device according to an embodiment of the disclosure.

Referring to FIG. 8A, an electronic device 101 (e.g., at least one of the first communication processor 212 in FIG. 2A, the second communication processor 214 in FIG. 2A, or the integrated communication processor 260 in FIG. 2B) may receive UL scheduling information in operation 801. In operation 803, the electronic device 101 may identify whether or not the UL scheduling information satisfies specified conditions. For example, the electronic device 101 may determine whether or not to operate a network-assistance-free mode depending on the uplink transmission mode determined by the base station 300. For example, the electronic device 101 may determine whether or not to operate a network-assistance-free mode according to the number of assigned layers or configuration of precoding/non-precoding, depending on the uplink transmission mode. If the scheduling information is received through the transmission of a single antenna port, the electronic device 101 may operate in a network-assistance-free mode. If the scheduling information in a non-codebook transmission mode is received, the electronic device 101 may operate in a network-assistance-free mode. If the scheduling information in an uplink precoding mode is received, the electronic device 101 may operate in a network-assistance-free mode. In addition to the above-described examples, the electronic device 101 may decide whether or not to determine the precoding information itself, based on at least some of the scheduling information received from the base station 300, or may be configured to decide whether or not to determine the precoding information itself, based on at least one combination of the respective pieces of the above information. If it is identified that the UL scheduling information satisfies the specified conditions ("Yes" in operation 803), the electronic device 101 may identify a precoder, based on the estimated UL channel, thereby performing precoding, in operation 805. If it is identified that the UL scheduling information does not satisfy the specified conditions ("No" in operation 803), the electronic device 101 may perform precoding, based on the precoder received from the base station 300, in operation 807. Alternatively, if it is identified that the UL scheduling information does not satisfy the specified conditions ("No" in operation 803), although not shown, the electronic device 101 may transmit data without performing precoding. For example, the electronic device 101 may transmit data using one layer. In various embodiments, although not shown, the electronic device 101 may always use the precoder identified based on the UL channel estimated by the electronic device 101, instead of identifying whether or not the specified conditions are satisfied in operation 803.

Figure 8B:
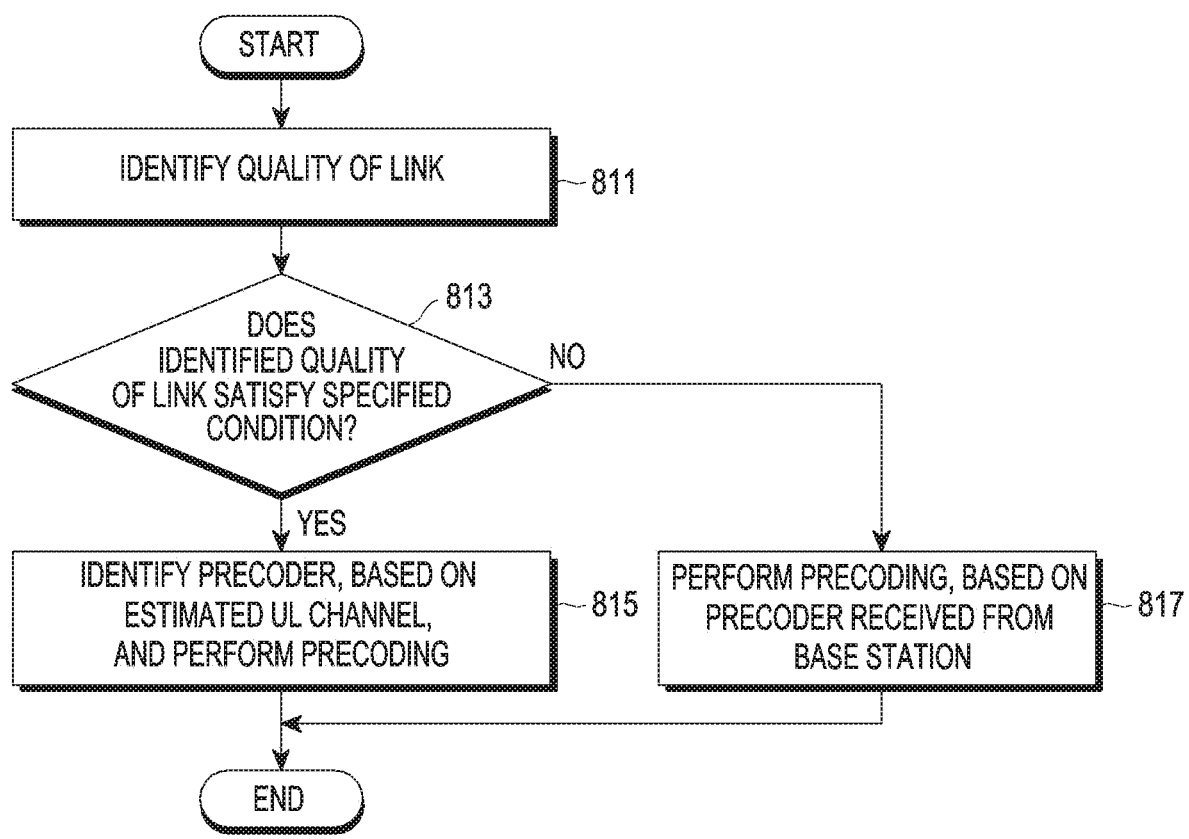
FIG. 8B is a flowchart illustrating a method of operating an electronic device according to an embodiment of the disclosure.

FIG. 8B is a flowchart illustrating a method of operating an electronic device according to an embodiment of the disclosure.

Referring to FIG. 8B, an electronic device 101 (e.g., at least one of the first communication processor 212 in FIG. 2A, the second communication processor 214 in FIG. 2A, or the integrated communication processor 260 in FIG. 2B) may identify the quality of a link in operation 811. In operation 813, the electronic device 101 may identify whether or not the quality of a link satisfies a specified condition. The specified condition may be a condition in which the electronic device 101 is configured to perform precoding without network assistance. For example, the electronic device 101 may identify at least one of reference signal received power (RSRP), a received signal strength indication (RSSI), reference signal received quality (RSRQ), or a signal-to-interference-plus-noise ratio (SINR) of a signal received from the base station 300. The electronic device 101 may compare at least one of the measurement results with a specified threshold, and may identify whether or not to perform precoding without network assistance, based on the comparison result. For example, if at least one of the measurement results is equal to or greater than a specified threshold, the electronic device 101 may determine to perform precoding without network assistance. In addition to the above-described example, the electronic device 101 may decide whether or not to determine the precoding information itself using any of indexes indicating the quality of a link. If it is identified that the quality of a link satisfies a specified condition ("Yes" in operation 813), the electronic device 101 may identify a precoder, based on the estimated UL channel, thereby performing precoding, in operation 815. If it is identified that the quality of a link does not satisfy a specified condition ("No" in operation 813), the electronic device 101 may perform precoding, based on the precoder received from the base station 300, in operation 817. Alternatively, if it is identified that the quality of a link does not satisfy a specified condition ("No" in operation 813), the electronic device 101 may transmit data without performing precoding. Alternatively, if the magnitude of transmission power of the electronic device 101 is greater than or equal to a threshold, the electronic device 101 may operate in a network-assistance-free mode.

Figure 8C:
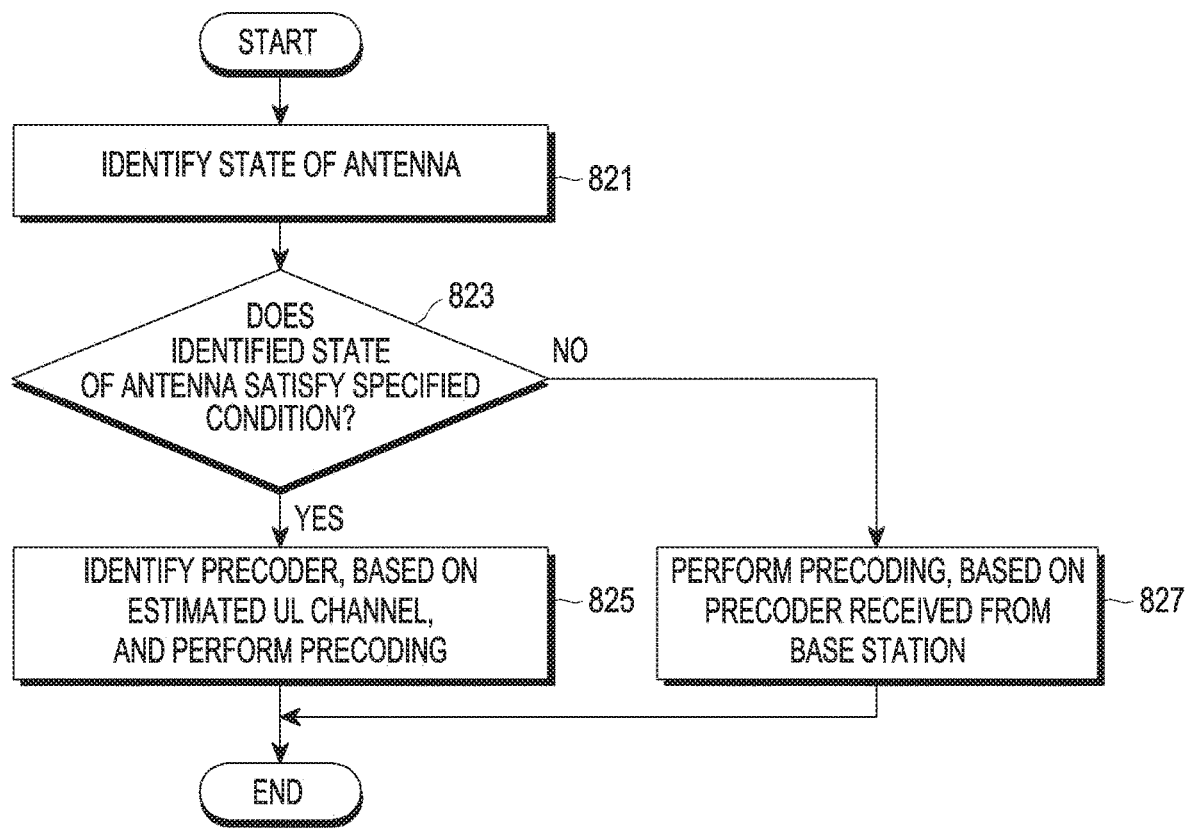
FIG. 8C is a flowchart illustrating a method of operating an electronic device according to an embodiment of the disclosure.

FIG. 8C is a flowchart illustrating a method of operating an electronic device according to an embodiment of the disclosure.

Referring to FIG. 8C, an electronic device 101 (e.g., at least one of the first communication processor 212 in FIG. 2A, the second communication processor 214 in FIG. 2A, or the integrated communication processor 260 in FIG. 2B) may identify the state of an antenna in operation 821. In operation 823, the electronic device 101 may identify whether or not the state of an antenna satisfies a specified condition. The specified condition may be a condition in which the electronic device 101 is configured to perform precoding without network assistance. For example, if an antenna correlation is greater than or equal to a specified threshold, the electronic device 101 may not operate a network-assistance-free mode. If the antenna correlation is less than a specified threshold, the electronic device 101 may operate a network-assistance-free mode. For example, if it is identified that an event of gripping a specific portion of the antenna in the hand (hand-gripping event) has occurred, the electronic device 101 may not operate a network-assistancefree mode. For example, if it is identified that the hand-gripping event has occurred, and if it is identified that there is a plurality of antennas in which a hand-gripping event has not occurred, the electronic device 101 may operate a network-assistance-free mode. In this case, the electronic device 101 may determine precoding information using the antennas in which the hand-gripping event has not occurred. The electronic device 101 may identify whether or not a hand-gripping event has occurred, based on the sensing data from a grip sensor. Alternatively, the electronic device 101 may identify the difference in at least one of RSRP, RSSI, or SINR between the antennas, and, if it is identified that the difference is greater than or equal to a specified threshold, may identify that a hand-gripping event has occurred. The electronic device 101 may identify whether or not to operate in a network-assistance-free mode, based on whether or not a combination including at least one of the above-described condition is satisfied.

If it is identified that the state of an antenna satisfies a specified condition ("Yes" in operation 823), the electronic device 101 may identify a precoder, based on the estimated UL channel, thereby performing precoding, in operation 825. If it is identified that the state of an antenna does not satisfy a specified condition ("No" in operation 823), the electronic device 101 may perform precoding, based on the precoder received from the base station 300, in operation 827. Alternatively, if it is identified that the state of an antenna does not satisfy a specified condition ("No" in operation 823), the electronic device 101 may transmit data without performing precoding.

Figure 8D:
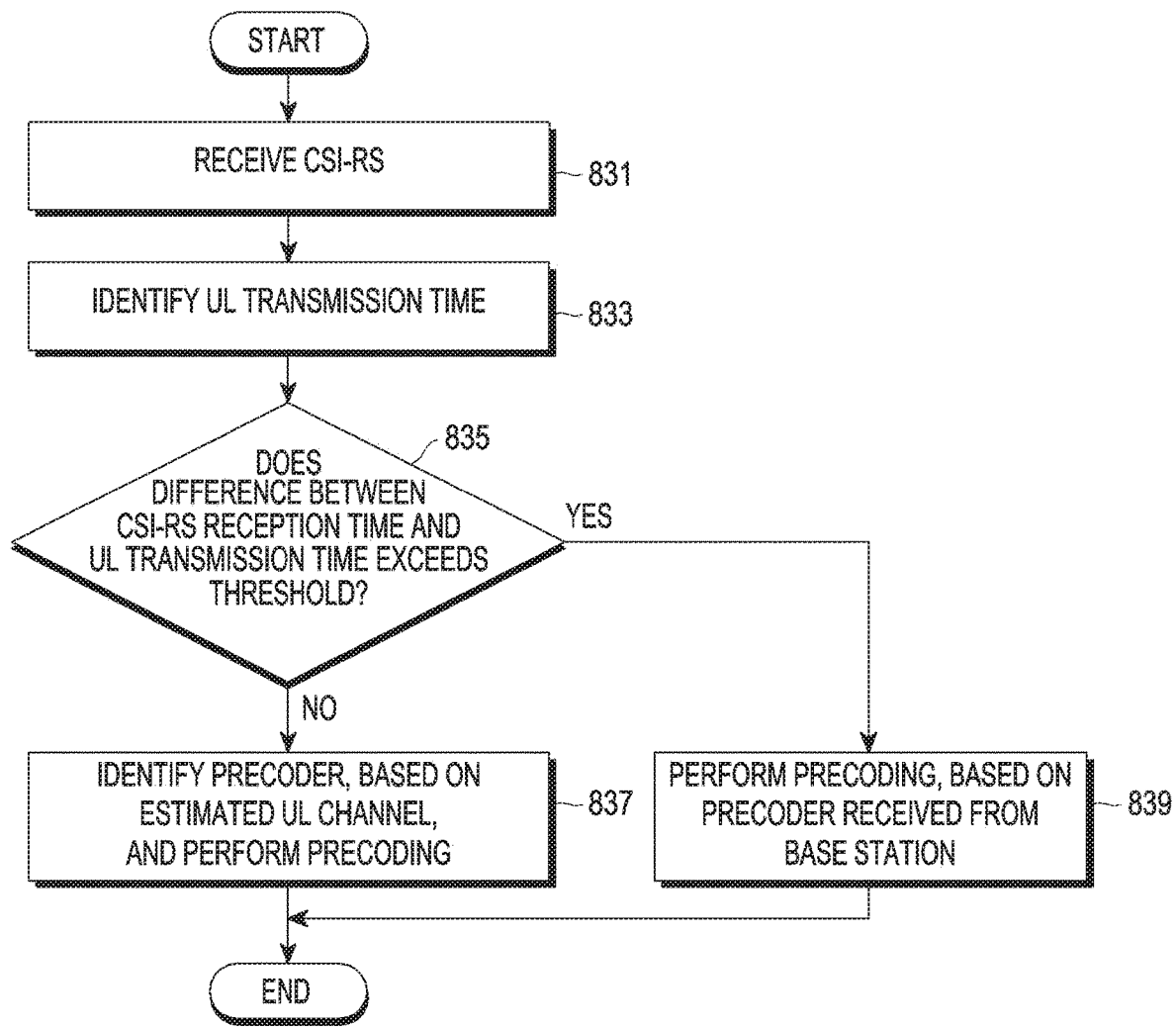
FIG. 8D is a flowchart illustrating a method of operating an electronic device according to an embodiment of the disclosure.

FIG. 8D is a flowchart illustrating a method of operating an electronic device according to an embodiment of the disclosure.

Referring to FIG. 8D, an electronic device 101 (e.g., at least one of the first communication processor 212 in FIG. 2A, the second communication processor 214 in FIG. 2A, or the integrated communication processor 260 in FIG. 2B) may receive a CSI-RS from a base station 300 in operation 831. In operation 833, the electronic device 101 may identify the transmission time of UL data. In operation 835, the electronic device 101 may identify whether or not the difference between the reception time of the CSI-RS and the transmission time of the UL data exceeds a threshold. As described above, the electronic device 101 according to various embodiments may estimate UL channel information from DL channel information, based on UL/DL channel reciprocity. If there is a big difference in time between the reception time of the CSI-RS for the DL channel information and the UL channel for the transmission of the UL data, the reliability of the UL channel estimated by the channel reciprocity may be degraded. Accordingly, the electronic device 101 may be configured to operate in a network-assistance-free mode if the UL data is scheduled to be transmitted with a difference equal to or less than a threshold at which reciprocity between the DL channel and the UL channel can be guaranteed. If the interval between the slot of the DL CSI-RS and the UL slot is equal to or less than a specified threshold, the electronic device 101 may operate in a network-assistance-free mode. In this case, the threshold may be a fixed value, or may vary depending on motion information of the electronic device 101 or the Doppler's frequency, which is changeable due to motion.

According to various embodiments, if it is identified that the difference between the reception time of the CSI-RS and the transmission time of the UL data does not exceed a threshold ("No" in operation 835), the electronic device 101 may identify a precoder, based on the estimated UL channel, thereby performing precoding in operation 837. If it is identified that the difference between the reception time of the CSI-RS and the transmission time of the UL data exceeds a threshold ("Yes" in operation 835), the electronic device 101 may perform precoding, based on the precoder received from the base station 300, in operation 839. Alternatively, if it is identified that the difference between the reception time of the CSI-RS and the transmission time of the UL data exceeds a threshold ("Yes" in operation 835), the electronic device 101 may transmit data without performing precoding.

According to various embodiments, the electronic device 101 may identify a precoder, based on the estimated UL channel, and may then predict the improvement of performance that can be obtained when applying the precoder. If the improvement value is equal to or less than a specific improvement threshold, the electronic device 101 may not use the identified precoder. The improvement in performance may be predicted by estimating current channel information and predicting the performance in the channel state according to the channel information. The electronic device 101 may use the estimated UL channel (H) as the performance when no precoder is applied, and may use an effective channel (HW) obtained by multiplying the estimated channel (H) by the identified precoder (W) as the performance when the precoder is applied. The electronic device 101 may predict channel capacity, throughput, and BLER performance for each of the estimated UL channel and the effective channel. The electronic device 101 may predict the channel capacity and the throughput, based on, for example, Shannon capacity. The electronic device 101 may predict the BLER performance, based on at least one of, for example, exponential effective SNR mapping (EESM), mean mutual information per bit (MMIB), or a received bit mutual information rate (RBIR). The above-described prediction method is only an example, and the prediction method is not limited thereto.

Figure 9A:
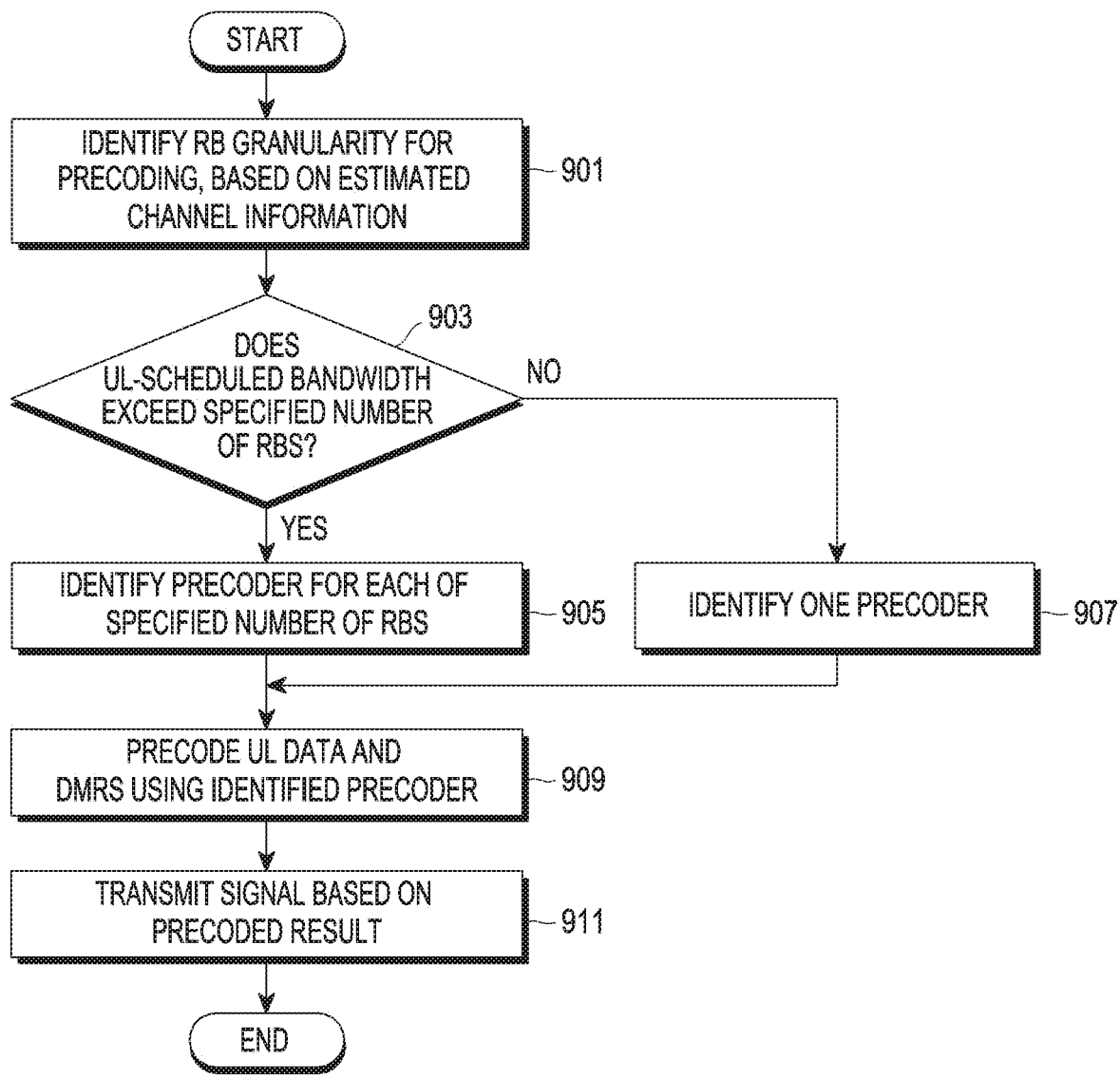
FIG. 9A is a flowchart illustrating a method of operating an electronic device according to an embodiment of the disclosure.

FIG. 9A is a flowchart illustrating a method of operating an electronic device according to an embodiment of the disclosure.

Referring to FIG. 9A, an electronic device 101 (e.g., at least one of the first communication processor 212 in FIG. 2A, the second communication processor 214 in FIG. 2A, or the integrated communication processor 260 in FIG. 2B) may identify RB granularity for precoding, based on estimated channel information, in operation 901. For example, the electronic device 101 may identify RB granularity for precoding, based on the channel information (e.g., a channel coherence bandwidth) estimated using the CSI-RS. In operation 903, the electronic device 101 may identify whether or not the UL-scheduled bandwidth exceeds a specified number of RBs. Here, the specified number may be determined based on the identified RB granularity, and the specified number of RBs may be a number that ensures that the similarity of at least one property between the RBs is equal to or greater than a specified level. For example, if the specified number is L, one precoder may be valid for L RBs, but the precoder may not be valid for other RBs adjacent to the L RBs. In various embodiments, the specified number of RBs may be determined by the channel coherence bandwidth, or may be configured as a fixed value.

According to various embodiments, if it is identified that the UL-scheduled bandwidth exceeds the specified number of RBs ("Yes" in operation 903), the electronic device 101 may identify the precoder for each of the specified number of RBs in operation 905. As described above, the specified number of RBs according to various embodiments may indicate the range within which one precoder is valid, and the fact that the UL-scheduled bandwidth exceeds the specified number of RBs may indicate that a plurality of precoders are required. Accordingly, the electronic device 101 may group the RBs corresponding to the UL-scheduled bandwidth in a specified number of units, and may determine the precoder for each group. The number of RBs included in at least some of the groups may be smaller than the specified number. If it is identified that the UL-scheduled bandwidth is less than or equal to the specified number of RBs ("No" in operation 903), the electronic device 101 may identify one precoder in operation 907. Since the entire UL scheduling bandwidth is less than or equal to the specified number of RBs in which one precoder is valid, the electronic device 101 may configure only one precoder for the entire bandwidth. In operation 909, the electronic device 101 may precode UL data and a DMRS using the identified precoder. In operation 911, the electronic device 101 may transmit a signal based on the precoded result.

Figure 9B:
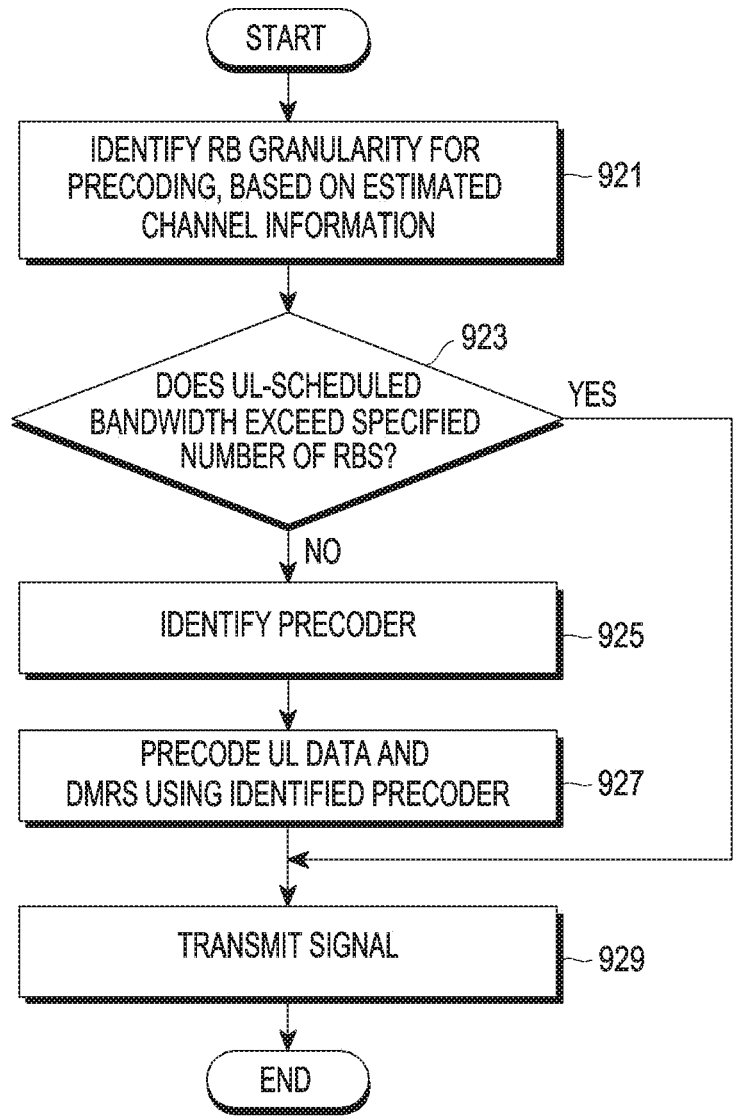
FIG. 9B is a flowchart illustrating a method of operating an electronic device according to an embodiment of the disclosure.

FIG. 9B is a flowchart illustrating a method of operating an electronic device according to an embodiment of the disclosure.

Referring to FIG. 9B, an electronic device 101 (e.g., at least one of the first communication processor 212 in FIG. 2A, the second communication processor 214 in FIG. 2A, or the integrated communication processor 260 in FIG. 2B) may identify RB granularity for precoding, based on the estimated channel information, in operation 921. In operation 923, the electronic device 101 may identify whether or not the UL-scheduled bandwidth exceeds a specified number of RBs. If it is identified that the UL-scheduled bandwidth does not exceed a specified number of RBs ("No" in operation 923), the electronic device 101 may identify a precoder in operation 925. The electronic device 101 may precode UL data and a DMRS using the precoder identified in operation 927. In operation 929, the electronic device 101 may transmit a signal after performing precoding. If it is identified that the UL-scheduled bandwidth exceeds a specified number of RBs ("Yes" in operation 923), the electronic device 101 may transmit a signal without performing precoding in operation 929.

Figure 10:
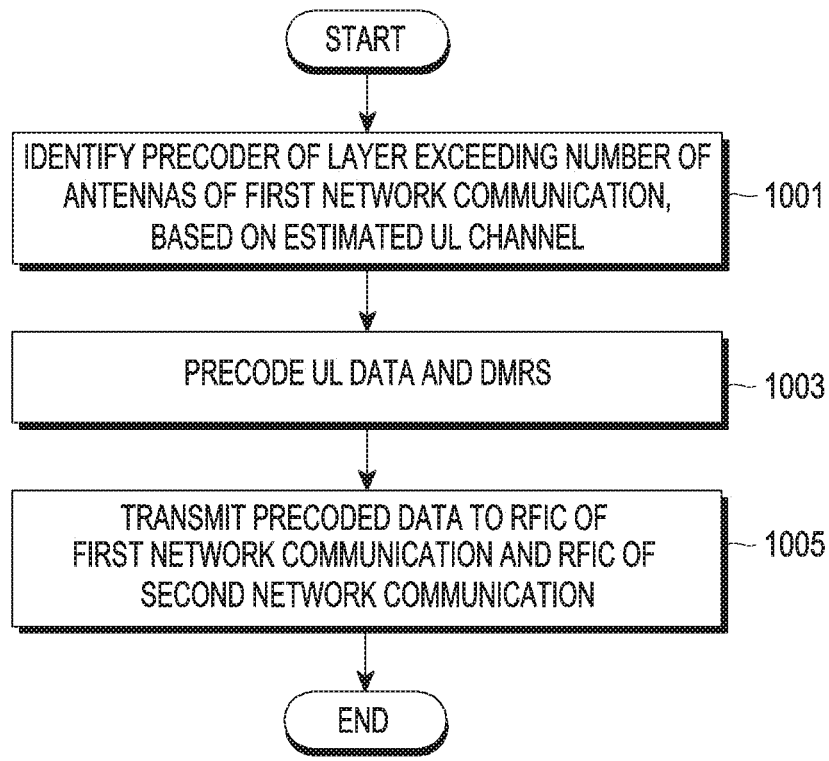
FIG. 10 is a flowchart illustrating a method of operating an electronic device according to an embodiment of the disclosure.

FIG. 10 is a flowchart illustrating a method of operating an electronic device according to an embodiment of the disclosure. The embodiment shown in FIG. 10 will be described in more detail with reference to FIG. 11.

Figure 11:
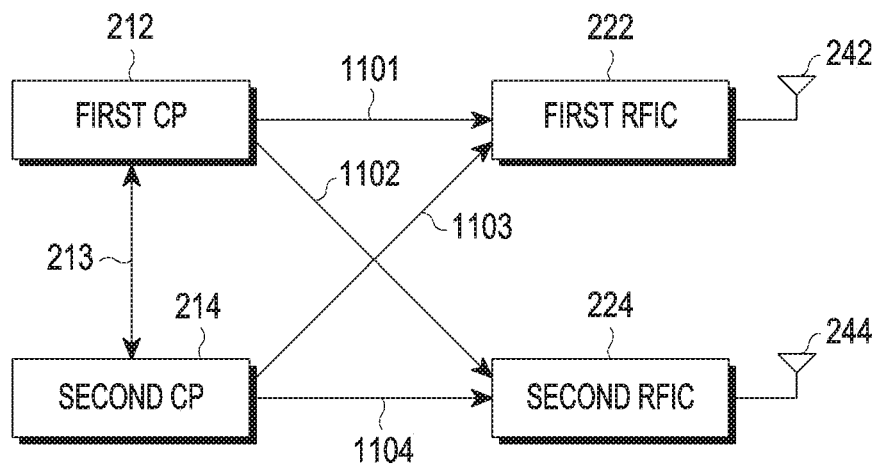
FIG. 11 is a diagram illustrating a connection relationship between communication processors and antennas according to an embodiment of the disclosure.

FIG. 11 is a diagram illustrating the connection relationship between communication processors and antennas according to an embodiment of the disclosure.

Referring to FIGS. 10 and 11, an electronic device 101 (e.g., at least one of the first communication processor 212 in FIG. 2A, the second communication processor 214 in FIG. 2A, or the integrated communication processor 260 in FIG. 2B) may identify the precoder of a layer that exceeds the number of antennas (e.g., the first antenna module 242 in FIG. 2A) of first network communication, based on the estimated UL channel, in operation 1001. For example, "n" antennas of the electronic device 101 may be allocated to first network communication (e.g., LTE communication), and "m" antennas thereof may be allocated to second network communication (e.g., NR communication). The first communication processor 212 or the integrated communication processor 260 according to the comparative example may configure a precoder corresponding to a layer (or rank) equal to or less than "m" antennas for the first network communication. However, the first communication processor 212 according to various embodiments may transmit data using at least some of the antennas allocated to the second network communication (e.g., the second antenna module 244 in FIG. 2A). Accordingly, it is possible to identify the precoder of a rank exceeding the number of antennas allocated to the first network communication. For example, as shown in FIG. 11, a first communication processor (CP) 212 may be connected to a first RFIC 222 through a first path 1101, and may be connected to a second RFIC 224 through a second path 1102. The first RFIC 222 may receive an input signal from any one of the first CP 212 or the second CP 214. The second RFIC 224 may receive an input signal from any one of the first CP 212 or the second CP 214. The second communication processor 214 may be connected to the first RFIC 222 through a third path 1103, and may be connected to the second RFIC 224 through a fourth path 1104. In addition, the first communication processor 212 and the second communication processor 214 may transmit and receive information therebetween through an inter-processor interface 213 (e.g., high-speed UART). For example, in the interval in which data is not transmitted/received through the second network communication, the first communication processor 212 may transmit UL data using at least a part of the second antenna module 244, as well as the first antenna module 242. In this case, the first communication processor 212 may configure the precoder corresponding to a rank equal to or less than the sum of the number of antennas of the first antenna module 242 and the number of antennas of at least a part of the second antenna module 244. The first communication processor 212 may identify information on the interval, in which data is not transmitted/received through the second network communication, using the inter-processor interface 213 (e.g., high-speed UART), and may transmit UL data using at least a part of the second antenna module 244, as well as the first antenna module 242, during the corresponding period. The second communication processor 214 may transmit, to the first communication processor 212, for example, information capable of identifying a UL subframe in which data transmission is not scheduled. For example, if the information transmitted between the CPs is "T", this may indicate that a network-assistance-free UL MIMO operation is possible during "T" subframes (or ms) from the time at which the signal is transmitted. Alternatively, the second communication processor 214 may transmit a flag of 1 or 0 to the first communication processor 212 in every subframe; "1" may indicate that the network-assistance-free UL MIMO operation is possible in the corresponding subframe; and "0" may indicate that the network-assistance-free UL MIMO operation is impossible in the corresponding subframe. For example, the transmitted information may be T1 and T2, which may indicate that the network-assistance-free UL MIMO operation is possible from time T1 to time T2.

According to various embodiments, in operation 1003, an electronic device 101 (e.g., at least one of the first communication processor 212 in FIG. 2A, the second communication processor 214 in FIG. 2A, or the integrated communication processor 260 in FIG. 2B) may precode UL data and a DMRS using the identified precoder. In operation 1005, the electronic device 101 may transmit the precoded data to the RFIC of the first network communication and the RFIC of the second network communication. Although it is described in the above example that the first communication processor 212 may use both antenna modules 242 and 244, this is only an example. In various embodiments, in the interval in which data is not transmitted/received through the first network communication, the second communication processor 214 may transmit data using at least a part of the first antenna module 242 allocated to the first network communication and at least a part of the second antenna module 244. In this case, a precoder corresponding to a rank exceeding the number of antennas of the second antenna module 244 may be identified.

Figure 12:
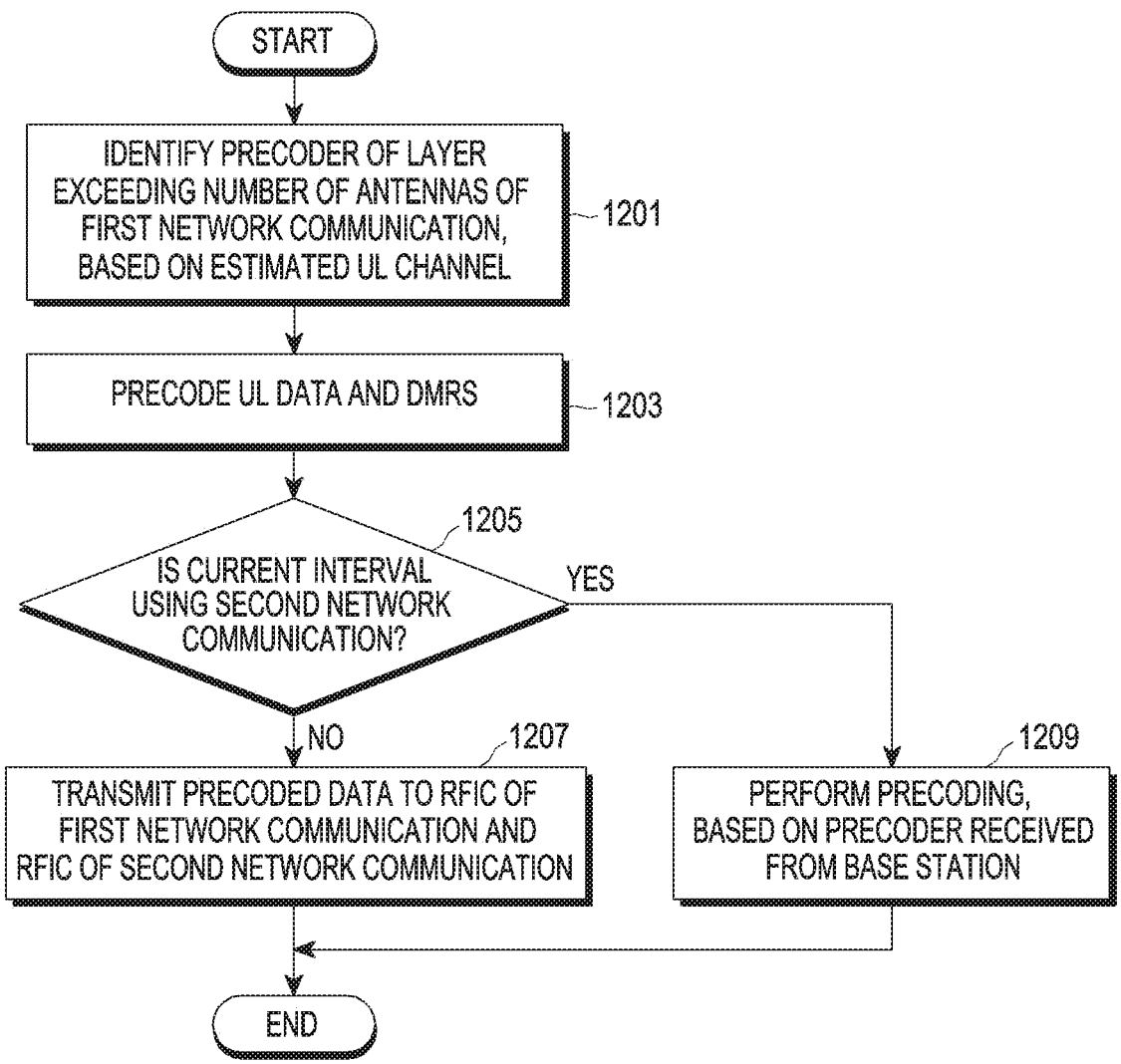
FIG. 12 is a flowchart illustrating a method of operating an electronic device according to an embodiment of the disclosure.

FIG. 12 is a flowchart illustrating a method of operating an electronic device according to an embodiment of the disclosure.

Referring to FIG. 12, an electronic device 101 (e.g., at least one of the first communication processor 212 in FIG. 2A, the second communication processor 214 in FIG. 2A, or the integrated communication processor 260 in FIG. 2B) may identify the precoder of a layer that exceeds the number of antennas of the first network communication, based on the estimated UL channel, in operation 1201. In operation 1203, the electronic device 101 may precode UL data and a DMRS. In operation 1205, the electronic device 101 may identify whether or not the current interval is an interval in which the second network communication is available. According to various embodiments, the first communication processor 212 may identify whether or not the second network communication is scheduled to be used through an interface (e.g., the inter-processor interface 213 in FIG. 11) between communication processors (e.g., the first CP 212 and the second CP 214 in FIGS. 2A and 11). In various embodiments, in the state in which an interface is not provided between the processors 212 and 214, for example, the first communication processor 212 may transmit/receive data to/from the second communication processor 214 through an AP (e.g., the processor 120 in FIG. 2A). The integrated communication processor 260 may manage the schedules of both the first network communication and the second network communication.

According to various embodiments, if it is identified that the current interval is not an interval in which the second network communication is available ("No" in operation 1205), the electronic device 101 may transmit the precoded data to the RFIC of the first network communication (e.g., the first RFIC 222 in FIGS. 2A, 2B, and 11) and the RFIC of the second network communication (e.g., the second RFIC 224 in FIGS. 2A, 2B, and 11) in operation 1207. According to various embodiments, if it is identified that the current interval is an interval in which the second network communication is available ("Yes" in operation 1205), the electronic device 101 may transmit UL data and a DMRS, which are not precoded, to the RFIC of the first network communication in operation 1209. According to various embodiments, the electronic device 101 may be configured to identify the precoder corresponding to a rank less than or equal to the number of antennas allocated to the first network communication, and precode data, based on the identified precoder.

According to various embodiments, the electronic device 101 may be configured to identify whether or not the current interval is an interval in which the second network communication is available, and then, if it is determined that the current interval is not an interval in which the second network communication is available, identify the precoder. In this case, the electronic device 101 may be configured not to identify the precoder, if it is identified that the second network communication is in use (or is to be used).

Figure 13:
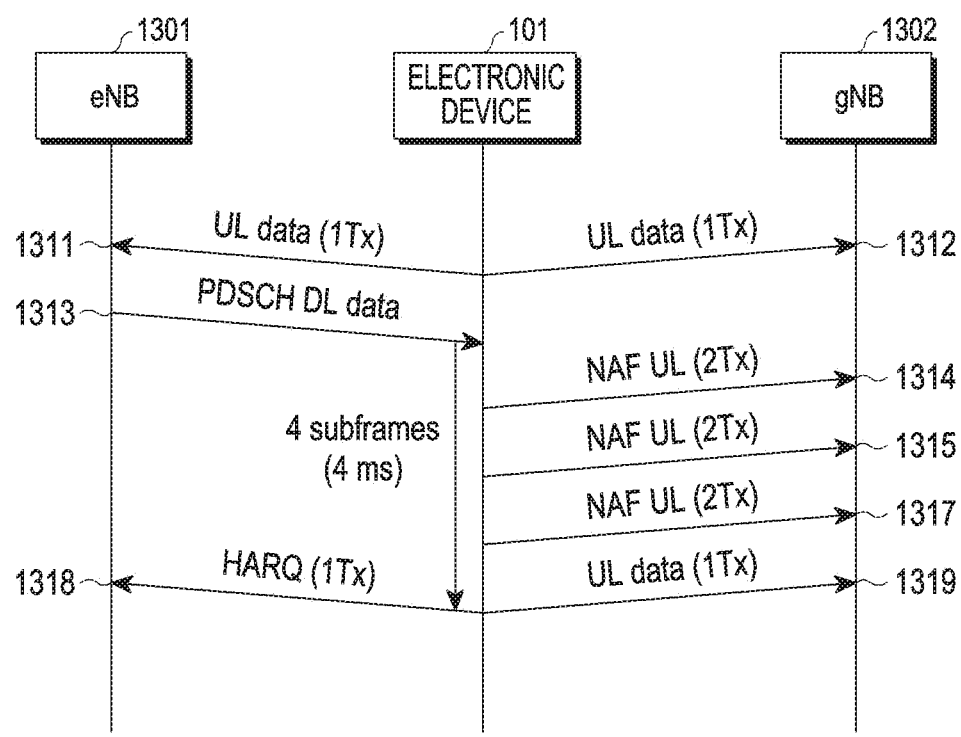
FIG. 13 is a flowchart illustrating the operation of an electronic device, an eNB, and a gNB according to an embodiment of the disclosure.

FIG. 13 is a flowchart illustrating the operation of an electronic device, an eNB, and a gNB according to an embodiment of the disclosure.

Referring to FIG. 13, an electronic device 101 (e.g., at least one of the first communication processor 212 in FIG. 2A, the second communication processor 214 in FIG. 2A, or the integrated communication processor 260 in FIG. 2B) may transmit UL data to an eNB 1301 through 1TX in operation 1311, and may transmit UL data to a gNB 1302 through 1TX in operation 1312. For example, the first communication processor 212 of the electronic device 101 may be connected to the first RFIC 222 through the first path 1101, and the second communication processor 214 may be connected to the second RFIC 224 through the fourth path 1104. In operation 1313, the electronic device 101 may receive PDSCH DL data from the eNB 1301. According to the standard, the electronic device 101 may be configured to transmit HARQ to the eNB 1301 four subframes (e.g., 4 ms) after receiving the PDSCH DL data. Accordingly, the transmission/reception of data may not be performed through LTE communication for a time (e.g., 4 ms) corresponding to four subframes after receiving the PDSCH DL data. If no PDSCH DL is present in the 4 ms before operation 1313, the transmission/reception of data may not be performed during 4 ms. For example, the communication processor corresponding to the LTE communication may transmit information on the interval, in which data is not transmitted/received, to the communication processor corresponding to the NR communication through an inter-processor interface. Accordingly, the electronic device 101 may transmit network-assistance-free (NAF) UL data to the gNB 1302 through 2 TX in operations 1314, 1315, and 1317. Thereafter, the electronic device 101 may transmit HARQ to the eNB 1301 through 1TX after four subframes in operation 1318. The electronic device 101 may transmit UL data to the gNB 1302 through 1TX in operation 1319.

Figure 14:
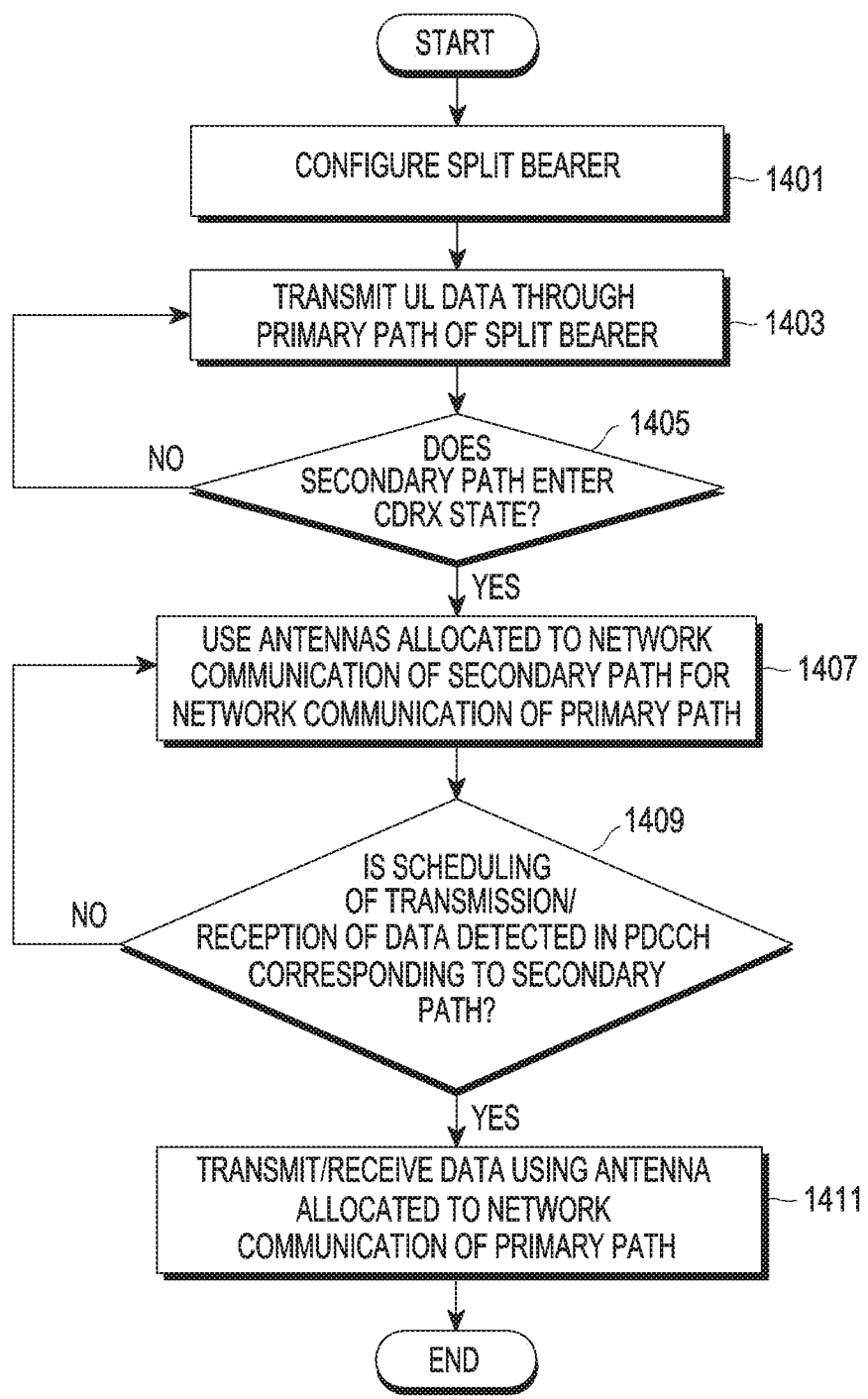
FIG. 14 is a flowchart illustrating a method of operating an electronic device according to an embodiment of the disclosure.

FIG. 14 is a flowchart illustrating a method of operating an electronic device according to an embodiment of the disclosure.

Referring to FIG. 14, an electronic device 101 (e.g., at least one of the first communication processor 212 in FIG. 2A, the second communication processor 214 in FIG. 2A, or the integrated communication processor 260 in FIG. 2B) may configure a split bearer with respect to a radio bearer between the UE and the BS in operation 1401. In operation 1403, the electronic device 101 may transmit UL data through a primary path of the split bearer. For example, the electronic device 101 may configure a primary path and a secondary path, based on information included in RRC connection reconfiguration. If the size of the transmission data (e.g., the total amount of packet data convergence protocol (PDCP) data volume and radio link control (RLC) data volume) is less than a threshold (e.g., an uplink split threshold), the electronic device 101 may transmit uplink data only through the primary path. Information on the uplink split threshold may be included in a UE-specific or UE-dedicated RRC signal (e.g., RRC connection reconfiguration).

According to various embodiments, the electronic device 101 may identify whether or not the secondary path enters a CDRX state in operation 1405. For example, if the transmission/reception of data is not performed during a specified time (e.g., a DRX inactivity timer) through the secondary path, the electronic device 101 may monitor the PDCCH in the secondary path for a specified period. If the secondary path enters the CDRX state, the electronic device 101 may use antennas (e.g., the first antenna module 242 in FIGS. 2A, 2B, and 11) allocated to the network communication of the secondary path for the network communication of the secondary path in operation 1407. The electronic device 101 may identify the precoder of a rank less than or equal to the sum of the number of antennas allocated to the network communication of the secondary path and the number of antennas allocated to the network communication of the primary path (e.g., the second antenna module 244 in FIGS. 2A, 2B, and 11), and may precode UL data and a DMRS, based on the identified precoder. In operation 1409, the electronic device 101 may identify whether or not the scheduling of transmission/reception of data is detected in the physical downlink control channel (PDCCH) corresponding to the secondary path. If the scheduling of transmission/reception of data is not detected in the PDCCH corresponding to the secondary path ("No" in operation 1409), the electronic device 101 may use the antennas allocated to the network communication of the secondary path for the network communication of the primary path. If the scheduling of transmission/reception of data is detected in the PDCCH corresponding to the secondary path ("Yes" in operation 1409), the electronic device 101 may transmit/receive data using the antenna allocated to the network communication of the primary path in operation 1411. In addition, the electronic device 101 may transmit/receive data for the network communication of the secondary path through the antenna allocated to the network communication of the secondary path.

According to various embodiments, an electronic device may include: at least one communication processor; at least one radio frequency integrated circuit (RFIC) configured to convert data transmitted from the at least one communication processor into at least one radio frequency signal (RF signal) and output the at least one RF signal; and at least one antenna configured to receive each of the at least one RF signal and radiate an electromagnetic field, wherein the at least one communication processor is configured to: receive, from a base station, a reference signal for identifying a state of a downlink channel between the electronic device and the base station through the at least one antenna and the at least one RFIC; based on the reference signal and association information between the downlink channel and an uplink channel between the electronic device and the base station, identify the uplink channel; based on the identified uplink channel, identify a precoder for the uplink channel; based on the identified precoder, precode uplink data and a demodulation reference signal (DMRS); and transmit a signal based on the precoded data to the base station, based on at least some of the at least one RFIC and the at least one antenna.

According to various embodiments, the at least one communication processor may be configured to: identify whether or not a condition configured to identify the precoder is satisfied; and based on identifying that the configured condition is satisfied, perform the identification of the uplink channel and the identification of the precoder.

According to various embodiments, the at least one communication processor may be configured to, based on identifying that the configured condition is not satisfied, transmit the uplink data to the base station without precoding the uplink data, based on at least some of the at least one RFIC and the at least one antenna.

According to various embodiments, the at least one communication processor may be configured to: transmit a sounding reference signal (SRS) to the base station, based on at least some of the at least one RFIC and the at least one antenna; receive, from the base station, precoding information identified by the base station by means of the SRS; based on identifying that the configured condition is not satisfied, precode the uplink data and the DMRS, based on the precoding information identified by the base station; and transmit a signal based on the precoded data to the base station, based on at least some of the at least one RFIC and the at least one antenna.

According to various embodiments, the at least one communication processor may be configured to: transmit a sounding reference signal (SRS) to the base station, based on at least some of the at least one RFIC and the at least one antenna; receive, from the base station, precoding information identified by the base station by means of the SRS; and based on identifying that the configured condition is satisfied, ignore the precoding information identified by the base station and precode the uplink data and the DMRS, based on the precoder identified by the electronic device.

According to various embodiments, the at least one communication processor may be configured to identify whether or not the configured condition is satisfied using at least some of scheduling information received from the base station.

According to various embodiments, the at least one communication processor may be configured to identify whether or not the configured condition is satisfied using a quality of a link between the electronic device and the base station.

According to various embodiments, the at least one communication processor may be configured to identify whether or not the configured condition is satisfied using a state of the at least one antenna.

According to various embodiments, the at least one communication processor may be configured to identify whether or not the configured condition is satisfied based on whether or not an interval between a reception time of the reference signal and a transmission time of the uplink data exceeds a specified threshold time.

According to various embodiments, the at least one communication processor may be configured to: compare at least one first performance value predicted based on the identified uplink channel with at least one second performance value predicted based on the product of the identified uplink channel and the identified precoder; and identify whether or not the configured condition is satisfied based on a result of comparing the at least one first performance value with the at least one second performance value.

According to various embodiments, the at least one processor may be configured to: identify the number of resource blocks (RBs) for comparison based on the uplink channel; and based on an uplink-scheduled bandwidth being less than or equal to the number of RBs, identify one precoder for an entirety of the uplink channel.

According to various embodiments, the at least one processor may be configured to: based on the uplink-scheduled bandwidth exceeding the number of RBs: group a bandwidth of the uplink channel based on the number of RBs and configure different precoders for respective ones of groups identified as a result of the grouping; or transmit the uplink data to the base station without precoding the uplink data, based on at least some of the at least one RFIC and the at least one antenna.

According to various embodiments, the at least one communication processor may be configured to: decompose the uplink channel into a matrix product of a first unitary matrix, a diagonal matrix, and a second unitary matrix, based on singular value decomposition (SVD); and identify a submatrix including at least some columns of the second unitary matrix as the precoder.

According to various embodiments, the at least one communication processor may be configured to identify a codebook maximizing achievable sum throughput in an entire band with respect to the uplink channel as the precoder.

According to various embodiments, an electronic device may include: at least one communication processor; at least one radio frequency integrated circuit (RFIC) configured to convert data transmitted from the at least one communication processor into at least one radio frequency signal (RF signal) and output the at least one RF signal; and at least one antenna configured to receive each of the at least one RF signal and radiate an electromagnetic field, wherein the at least one communication processor is configured to: receive, from a base station, a first reference signal for identifying a state of a downlink channel between the electronic device and the base station through the at least one antenna and the at least one RFIC; transmit a second reference signal for identifying a state of an uplink channel between the electronic device and the base station through the at least one antenna and the at least one RFIC; receive scheduling information identified by the base station based on the second reference signal, through the at least one antenna and the at least one RFIC; based on the first reference signal and association information between the downlink channel and the uplink channel between the electronic device and the base station, identify the uplink channel; based on the identified uplink channel, identify a precoder for the uplink channel; based on the scheduling information being determined to be used, transmit uplink data and a demodulation reference signal (DMRS) using the scheduling information; and based on the precoder being determined to be used, precode the uplink data and the DMRS using the precoder and transmit the precoded uplink data and the precoded DMRS.

According to various embodiments, an electronic device may include: at least one communication processor configured to support first network communication and second network communication; at least one first radio frequency integrated circuit (RFIC) configured to convert data transmitted from the at least one communication processor into at least one first radio frequency signal (RF signal) based on the first network communication and output the at least one first RF signal; at least one first antenna configured to receive each of the at least one first RF signal and radiate an electromagnetic field; at least one second RFIC configured to convert data transmitted from the at least one communication processor into at least one second RF signal based on the second network communication and output the at least one second RF signal; and at least one second antennas configured to receive each of the at least one second RF signal and radiate an electromagnetic field, wherein the at least one communication processor is configured to: identify that the second network communication is inactive during a first period; identify a precoder corresponding to at least some of the at least one first antenna and the at least one second antenna which are to be used during the first period; precode uplink data and a demodulation reference signal (DMRS) based on the first network communication using the identified precoder; and output a signal based on the precoded data using at least some of the at least one first RFIC and the at least one second RFIC so as to transmit the signal using the at least some of the at least one first antenna and the at least one second antenna during the first period.

According to various embodiments, the at least one communication processor may include a first communication processor for the first network communication, and a second communication processor for the second network communication.

According to various embodiments, the first communication processor may be configured to receive information about the first period from the second communication processor.

According to various embodiments, the first communication processor may be configured to receive, from the second communication processor, information indicating the number of subframes associated with the first period or information indicating the start time of the first period and the end time of the first period, as the information about the first period.

According to various embodiments, the at least one communication processor may be configured to: after the first period expires, output uplink data of the first network communication using the at least one first RFIC so as to transmit the uplink data of the first network communication through the at least one first antenna; and output uplink data of the second network communication using the at least one second RFIC so as to transmit the uplink data of the second network communication through the at least one second antenna.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments set forth herein may be implemented as software (e.g., a program) including one or more instructions stored in a storage medium (e.g., internal memory or external memory) that is readable by a machine (e.g., a master device or a task performing device). For example, a processor of a machine (e.g., a master device or a task performing device) may invoke at least one instruction among the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A user equipment (UE) comprising:
    at least one communication processor;
    at least one radio frequency integrated circuit (RFIC) configured to convert data transmitted from the at least one communication processor into at least one radio frequency (RF) signal and output the at least one RF signal; and
    at least one antenna configured to receive each of the at least one RF signal and radiate an electromagnetic field,
    wherein the at least one communication processor is configured to:
        receive, from a base station, a downlink channel state information reference signal (DL CSI-RS) for identifying a state of a downlink channel between the UE and the base station through the at least one antenna and the at least one RFIC,
        using reciprocity information between the downlink channel and an uplink channel between the UE and the base station, identify information about the uplink channel, based on the DL CSI-RS received from the base station,
        based on the information about the identified uplink channel, identify a precoder for the identified uplink channel from a subset of precoders,
        based on the identified precoder, precode uplink data and a demodulation reference signal (DMRS),
        transmit a signal based on the precoded data to the base station using at least some of the at least one RFIC and the at least one antenna,
        identify whether a configured condition is satisfied based on whether an interval between a reception time of the DL CSI-RS and a transmission time of the uplink data exceeds a specified threshold time, and
        based on identifying that the configured condition is satisfied, perform the identification of the uplink channel and the identification of the precoder.

2. The UE of claim 1, wherein the at least one communication processor is further configured to, based on identifying that the configured condition is not satisfied, transmit the uplink data to the base station without precoding the uplink data, using the at least some of the at least one RFIC and the at least one antenna.

3. The UE of claim 1, wherein the at least one communication processor is further configured to:
    transmit a sounding reference signal (SRS) to the base station using the at least some of the at least one RFIC and the at least one antenna,
    receive, from the base station, precoding information identified by the base station by means of the SRS,
    based on identifying that the configured condition is not satisfied, precode the uplink data and the DMRS, based on the precoding information identified by the base station, and
    transmit a signal based on the precoded data to the base station using the at least some of the at least one RFIC and the at least one antenna.

4. The UE of claim 1, wherein the at least one communication processor is further configured to:
    transmit a sounding reference signal (SRS) to the base station using the at least some of the at least one RFIC and the at least one antenna,
    receive, from the base station, precoding information identified by the base station by means of the SRS, and
    based on identifying that the configured condition is satisfied, ignore the precoding information identified by the base station and precode the uplink data and the DMRS, based on the precoder identified by the UE.

5. The UE of claim 1, wherein the at least one communication processor is further configured to identify whether the configured condition is satisfied using at least some of scheduling information received from the base station.

6. The UE of claim 1, wherein the at least one communication processor is further configured to identify whether the configured condition is satisfied using a quality of a link between the UE and the base station.

7. The UE of claim 1, wherein the at least one communication processor is further configured to identify whether the configured condition is satisfied using a state of the at least one antenna.

8. The UE of claim 1, wherein the at least one communication processor is further configured to:
compare at least one first performance value predicted based on the identified uplink channel with at least one second performance value predicted based on a product of the identified uplink channel and the identified precoder, and
identify whether the configured condition is satisfied based on a result of comparing the at least one first performance value with the at least one second performance value.

9. The UE of claim 1, wherein the at least one communication processor is further configured to:
identify a number of resource blocks (RBs) for comparison based on the uplink channel, and
based on an uplink-scheduled bandwidth being less than or equal to the number of RBs, identify one precoder for an entirety of the uplink channel.

10. The UE of claim 9, wherein the at least one communication processor is further configured to:
based on the uplink-scheduled bandwidth exceeding the number of RBs:
group a bandwidth of the uplink channel based on the number of RBs and configure different precoders for respective ones of groups identified as a result of the grouping, or
transmit the uplink data to the base station without precoding the uplink data using the at least some of the at least one RFIC and the at least one antenna.

11. The UE of claim 1, wherein the at least one communication processor is further configured to:
decompose the uplink channel into a matrix product of a first unitary matrix, a diagonal matrix, and a second unitary matrix, based on singular value decomposition (SVD), and
identify a submatrix including at least some columns of the second unitary matrix as the identified precoder.

12. The UE of claim 1, wherein the at least one communication processor is further configured to identify a codebook maximizing achievable sum throughput in an entire band with respect to the identified uplink channel as the identified precoder.

13. A user equipment (UE) comprising:
at least one communication processor;
at least one radio frequency integrated circuit (RFIC) configured to convert data transmitted from the at least one communication processor into at least one radio frequency (RF) signal and output the at least one RF signal; and
at least one antenna configured to receive each of the at least one RF signal and radiate an electromagnetic field,
wherein the at least one communication processor is configured to:
receive, from a base station, a downlink channel state information reference signal (DL CSI-RS) for identifying a state of a downlink channel between the UE and the base station through the at least one antenna and the at least one RFIC,
transmit a sounding reference signal (SRS) for identifying a state of an uplink channel between the UE and the base station through the at least one antenna and the at least one RFIC,
receive scheduling information identified by the base station based on the SRS, through the at least one antenna and the at least one RFIC,
based on the DL CSI-RS, using reciprocity information between the downlink channel and the uplink channel between the UE and the base station, identify information about the uplink channel,
based on the information about the identified uplink channel, identify a precoder for the identified uplink channel from a subset of precoders,
based on the scheduling information being determined to be used, transmit uplink data and a demodulation reference signal (DMRS) using the scheduling information,
based on the precoder being determined to be used, precode the uplink data and the DMRS using the precoder and transmit the precoded uplink data and the precoded DMRS,
identify whether a configured condition is satisfied based on whether an interval between a reception time of the DL CSI-RS and a transmission time of the uplink data exceeds a specified threshold time, and
based on identifying that the configured condition is satisfied, perform the identification of the uplink channel and the identification of the precoder.

14. A user equipment (UE) comprising:
at least one communication processor configured to support first network communication and second network communication;
at least one first radio frequency integrated circuit (RFIC) configured to convert data transmitted from the at least one communication processor into at least one first radio frequency (RF) signal based on the first network communication and output the at least one first RF signal;
at least one first antenna configured to receive each of the at least one first RF signal and radiate an electromagnetic field;
at least one second RFIC configured to convert the data transmitted from the at least one communication processor into at least one second RF signal based on the second network communication and output the at least one second RF signal; and
at least one second antenna configured to receive each of the at least one second RF signal and radiate an electromagnetic field,
wherein the at least one communication processor is configured to:
identify that the second network communication is inactive during a first period, by determining that no data is transferred via the second network communication during the first period,
identify a precoder corresponding to at least two of the at least one first antenna and the at least one second antenna which are to be used during the first period,
precode uplink data and a demodulation reference signal (DMRS) based on the first network communication using the identified precoder,
output a signal based on the precoded data using at least two of the at least one first RFIC and the at least one second RFIC so as to transmit the signal using the at least two of the at least one first antenna and the at least one second antenna during the first period,
identify whether a configured condition is satisfied based on whether an interval between a reception time of a downlink channel state information reference signal (DL CSI-RS) and a transmission time of the uplink data exceeds a specified threshold time, and based on identifying that the configured condition is satisfied, perform the identification of the precoder.

15. The UE of claim 14, wherein the at least one communication processor comprises a first communication processor for the first network communication, and a second communication processor for the second network communication.

16. The UE of claim 15, wherein the first communication processor is further configured to receive information about the first period from the second communication processor.

17. The UE of claim 16, wherein the first communication processor is further configured to receive, from the second communication processor, information indicating a number of subframes associated with the first period or information indicating a start time of the first period and an end time of the first period, as the information about the first period.

18. The UE of claim 14, wherein the at least one communication processor is further configured to:

after the first period expires, output uplink data of the first network communication using the at least one first RFIC so as to transmit the uplink data of the first network communication through the at least one first antenna, and output uplink data of the second network communication using the at least one second RFIC so as to transmit the uplink data of the second network communication through the at least one second antenna.

19. The UE of claim 14, wherein the at least one communication processor is further configured to identify the precoder of a rank less than or equal to a sum of a number of antennas allocated to the first network communication and a number of antennas allocated to the second network communication.

* * * * *